United States Patent
Kanda et al.

(10) Patent No.: US 12,344,744 B2
(45) Date of Patent: Jul. 1, 2025

(54) POLYARYLENE SULFIDE RESIN COMPOSITION, MOLDED ARTICLE OBTAINED BY MOLDING SAME, LAMINATE, AND PRODUCTION METHOD THEREOF

(71) Applicant: DIC Corporation, Tokyo (JP)

(72) Inventors: Tomomichi Kanda, Ichihara (JP); Takamichi Aoki, Ichihara (JP)

(73) Assignee: DIC Corporation, Tokyo (JP)

( * ) Notice: Subject to any disclaimer, the term of this patent is extended or adjusted under 35 U.S.C. 154(b) by 844 days.

(21) Appl. No.: 17/609,888

(22) PCT Filed: Jun. 2, 2020

(86) PCT No.: PCT/JP2020/021742
§ 371 (c)(1),
(2) Date: Nov. 9, 2021

(87) PCT Pub. No.: WO2020/246459
PCT Pub. Date: Dec. 10, 2020

(65) Prior Publication Data
US 2022/0204768 A1   Jun. 30, 2022

(30) Foreign Application Priority Data
Jun. 4, 2019   (JP) ................. 2019-104784

(51) Int. Cl.
| | |
|---|---|
| *C08L 81/02* | (2006.01) |
| *B29C 48/00* | (2019.01) |
| *B29C 48/40* | (2019.01) |
| *B32B 15/08* | (2006.01) |
| *B32B 15/088* | (2006.01) |
| *B32B 15/20* | (2006.01) |
| *B32B 27/16* | (2006.01) |

(Continued)

(52) U.S. Cl.
CPC ............ *C08L 81/02* (2013.01); *B29C 48/022* (2019.02); *B29C 48/40* (2019.02); *B32B 15/08* (2013.01); *B32B 15/088* (2013.01); *B32B 15/20* (2013.01); *B32B 27/16* (2013.01); *B32B 27/18* (2013.01); *B32B 27/285* (2013.01); *B32B 27/286* (2013.01); *B32B 27/34* (2013.01); *C08G 75/0204* (2013.01); *C08G 75/0209* (2013.01); *C08J 3/203* (2013.01); *C08J 5/043* (2013.01); *C08K 3/22* (2013.01); *C08K 3/346* (2013.01); *C08K 7/14* (2013.01); *C08L 77/00* (2013.01); *C08L 77/06* (2013.01); *C08L 77/10* (2013.01); *B29C 2948/92704* (2019.02); *B32B 2250/02* (2013.01); *B32B 2262/101* (2013.01); *B32B 2264/102* (2013.01); *B32B 2264/302* (2020.08); *B32B 2264/303* (2020.08); *B32B 2270/00* (2013.01); *B32B 2307/306* (2013.01); *B32B 2307/732* (2013.01); *B32B 2457/00* (2013.01); *B32B 2605/00* (2013.01); *C08J 2369/00* (2013.01); *C08J 2371/12* (2013.01); *C08J 2377/00* (2013.01); *C08J 2481/04* (2013.01); *C08K 2003/2248* (2013.01); *C08K 2003/2251* (2013.01); *C08L 2201/08* (2013.01); *C08L 2203/30* (2013.01); *C08L 2205/22* (2013.01)

(58) Field of Classification Search
CPC .......... C08L 81/02; C08L 77/10; C08L 77/06; C08L 77/00; C08L 2201/08; C08L 2203/30; C08L 2205/22; C08K 3/22; C08K 3/346; C08K 7/14; C08K 2003/2248; C08K 2003/2251; C08J 3/203; C08J 5/043; C08J 2369/00; C08J 2371/12; C08J 2377/00; C08J 2481/04; C08G 75/0209; C08G 75/0204; B29C 48/022; B29C 48/40; B29C 2948/92704; B32B 15/08; B32B 15/088; B32B 15/20; B32B 27/18; B32B 27/16; B32B 27/286; B32B 27/34; B32B 27/285; B32B 2250/02; B32B 2264/302; B32B 2307/732; B32B 2262/101; B32B 2457/00; B32B 2264/303; B32B 2270/00; B32B 2264/102; B32B 2307/306; B32B 2605/00

See application file for complete search history.

(56) References Cited

U.S. PATENT DOCUMENTS

| | | |
|---|---|---|
| 2012/0276390 A1 | 11/2012 | Ji et al. |
| 2015/0175804 A1 | 6/2015 | Aepli |
| 2015/0175805 A1 | 6/2015 | Schaefer |

FOREIGN PATENT DOCUMENTS

| | | | |
|---|---|---|---|
| EP | 2236560 A1 | 10/2010 | |
| EP | 3699234 A1 | 8/2020 | |

(Continued)

*Primary Examiner* — Patrick D Niland
(74) *Attorney, Agent, or Firm* — Troutman Pepper Locke LLP; James E. Armstrong, IV; Nicholas J. DiCeglie, Jr.

(57) ABSTRACT

The present invention is a molded article containing a polyarylene sulfide resin, a thermoplastic resin other than the polyarylene sulfide resin, and a metal oxide containing at least one of copper or chromium. The polyarylene sulfide resin forms a continuous phase, and a dispersed phase containing the thermoplastic resin and the metal oxide is present in the continuous phase. The present invention is also a polyarylene sulfide resin composition for providing it, a molded article having a roughened surface, a laminate of the molded article and metal, and methods for producing them. According to the present invention, there is provided a molded article that has superior heat resistance of a polyarylene sulfide resin, on which the speed of plating deposition is practical, and with which a laminate with potentially maintained adhesiveness of plating can be obtained and a method for producing it, as well as a polyarylene sulfide resin composition.

12 Claims, 2 Drawing Sheets

(51) Int. Cl.
    *B32B 27/18*     (2006.01)
    *B32B 27/28*     (2006.01)
    *B32B 27/34*     (2006.01)
    *C08G 75/0204*     (2016.01)
    *C08G 75/0209*     (2016.01)
    *C08J 3/20*     (2006.01)
    *C08J 5/04*     (2006.01)
    *C08K 3/22*     (2006.01)
    *C08K 3/34*     (2006.01)
    *C08K 7/14*     (2006.01)
    *C08L 77/00*     (2006.01)
    *C08L 77/06*     (2006.01)
    *C08L 77/10*     (2006.01)

(56) References Cited

FOREIGN PATENT DOCUMENTS

| | | |
|---|---|---|
| JP | 2009-132874 A | 6/2009 |
| JP | 2009-179766 A | 8/2009 |
| JP | 2015-108120 A | 6/2015 |
| WO | 2012/056416 A1 | 5/2012 |
| WO | 2018066637 A1 | 4/2018 |

POLYARYLENE SULFIDE RESIN COMPOSITION, MOLDED ARTICLE OBTAINED BY MOLDING SAME, LAMINATE, AND PRODUCTION METHOD THEREOF

TECHNICAL FIELD

The present invention relates to a polyarylene sulfide resin composition, a molded article obtained by molding it, a laminate, and methods for producing them.

BACKGROUND ART

In recent years, electronic components, automotive components, etc., are becoming smaller and lighter-weight, and as a technology that allows the industry to address this, technology relating to molded interconnect devices (MIDs) has been attracting attention. MID is a technology in which circuits, electrodes, etc., are formed on a resin molded article, allowing the manufacturer to reduce the size and weight of components as a result of the circuits, electrodes, etc., being unified with a resin molded article.

MID processes include, for example, one-step molding, in which the surface of a resin molded article is roughened and plated, two-step molding, in which a resin for forming circuits and a resin for forming insulating portions are molded separately, twice, and this is unified, and hot stamping, in which circuits, for example, are formed directly on a resin molded article using stamping dies.

One of one-step molding processes of these, the technology of direct structuring using a laser (also referred to as LDS, "laser direct structuring.") is attracting particular attention for reasons such as that it helps reduce the production cost and allows the manufacturer to fabricate superfine circuits. It should be noted that the LDS technology is a technology in which when a resin molded article containing a predetermined additive is irradiated with a laser, the surface of the portions irradiates with a laser is roughened, and the portions are activated, and a plating layer is formed selectively on the laser-irradiated portions.

Hence research on resin compositions that can be applied to the LDS technology is ongoing. For example, in PTL 1, an invention relating to a resin composition for laser direct structuring containing 0.5 to 10 parts by mass of an elastomer, 5 to 20 parts by mass of a metal oxide containing copper and chromium, 5 to 30 parts by mass of a phosphazene compound, and 0.1 to 1 part by mass of polytetrafluoroethylene per 100 parts by mass of a component that contains 40% to 95% by mass resin component and 5% to 60% by mass glass fiber, wherein the resin component contains 65% to 90% by weight polycarbonate resin and 35% to 10% by weight styrene resin, is described. It is stated that according to this resin composition for laser direct structuring, the resin composition is superior in mechanical properties such as flexural modulus and flame retardancy while maintaining platability.

It should be noted that in PTL 1, it is stated that the resin component contains a polycarbonate resin and a styrene resin.

Furthermore, in PTL 1, it is stated that the amount of the metal oxide containing copper and chromium is between 5 and 20 parts by mass, and that if this amount is equal to or more than 20 parts by mass, unfortunately, impact properties are affected, the polycarbonate resin in the resin component decomposes, and flame retardancy is inferior.

Incidentally, polyarylene sulfide resins, typified by polyphenylene sulfide resins, have been used in applications such as components of electric/electronic equipment and automotive components as they have high heat resistance and also are superior in mechanical strength, chemical resistance, shapability, and dimensional stability.

CITATION LIST

Patent Literature

PTL 1: Japanese Unexamined Patent Application Publication No. 2015-108120

SUMMARY OF INVENTION

Technical Problem

According to the resin composition described in PTL 1 for laser direct structuring, certain characteristics can be attained. However, PTL 1 is premised on the state in which the resin composition contain polycarbonate and styrene resins, so the composition is not necessarily good enough, for example in heat resistance. It was found that when one tries to apply the technology described in PTL 1 to polyarylene sulfide resins to address this, the speed of plating deposition decreases, it becomes difficult to achieve a practical speed of plating deposition, and productivity is affected. It then turned out that when the metal oxide mentioned above containing copper and chromium, for example, is increased to accelerate the speed of plating deposition, this affects the adhesiveness of the plating.

Against this background, an object of the present invention is to provide a molded article that has superior heat resistance of a polyarylene sulfide resin, on which the speed of plating deposition is practical, and with which a laminate with potentially maintained adhesiveness of plating can be obtained and a method for producing it, as well as a polyarylene sulfide resin composition with which such a molded article can be provided and a method for producing it.

Furthermore, an object of the present invention is to provide a laminate made using the molded article and superior in the adhesiveness of plating and a method for producing the laminate that is superior in the same adhesiveness, in which the speed of plating deposition is practical, and that is superior in productivity.

Solution to Problem

To solve these problems, the inventors conducted extensive research. As a result, the inventors found that these problems can be solved by making a molded article containing a polyarylene sulfide resin a predetermined chemical makeup, finally completing the present invention.

That is, the present invention is a molded article containing a polyarylene sulfide resin, a thermoplastic resin other than the polyarylene sulfide resin, and a metal oxide containing at least one of copper or chromium, wherein the polyarylene sulfide resin forms a continuous phase, and a dispersed phase containing the thermoplastic resin and the metal oxide is formed in the continuous phase.

Furthermore, the present invention is a polyarylene sulfide resin composition used for the molded article, and is a polyarylene sulfide resin composition containing a polyarylene sulfide resin, a thermoplastic resin other than the polyarylene sulfide resin, and a metal oxide containing at least one of copper or chromium, wherein the polyarylene sulfide resin forms a continuous phase, and a dispersed phase containing the thermoplastic resin and the metal oxide is formed in the continuous phase.

Moreover, the present invention is a laminate of the molded article and metal, wherein the metal is placed in contact with the roughened surface.

Furthermore, the present invention is a method for producing a polyarylene sulfide resin composition containing a polyarylene sulfide resin, a thermoplastic resin other than the polyarylene sulfide resin, and a metal oxide containing at least one of copper or chromium, and is a method for producing a polyarylene sulfide resin composition that includes step 1, in which a thermoplastic resin composition is obtained by melting and kneading at least the thermoplastic resin and the metal oxide, and step 2, in which a polyarylene sulfide resin composition is obtained by melting and kneading at least the thermoplastic resin composition and the polyarylene sulfide resin.

Moreover, the present invention is a method for producing a molded article that has step 3, in which a polyarylene sulfide resin composition obtained in the above method for producing a polyarylene sulfide resin is melted and molded.

Furthermore, the present invention is a method for producing a laminate of a molded article and metal, the molded article containing a polyarylene sulfide resin, a thermoplastic resin other than the polyarylene sulfide resin, and a metal oxide containing at least one of copper or chromium, the polyarylene sulfide resin forming a continuous phase and there being formed in the continuous phase a dispersed phase containing the thermoplastic resin and the metal oxide, and having a roughened surface on part of a surface thereof. The method has step 5, in which metal is placed in contact with the roughened surface.

Advantageous Effects of Invention

According to the present invention, there can be provided a molded article that has superior heat resistance of a polyarylene sulfide resin, on which the speed of plating deposition is practical, and with which a laminate with potentially maintained adhesiveness of plating can be obtained and a method for producing it, as well as a polyarylene sulfide resin composition with which such a molded article can be provided and a method for producing it.

Furthermore, according to the present invention, there can be provided a laminate made using this molded article and superior in the adhesiveness of plating and a method for producing this laminate that is superior in the same adhesiveness, in which the speed of plating deposition is practical, and that is superior in productivity.

DESCRIPTION OF EMBODIMENTS

Figure 1:
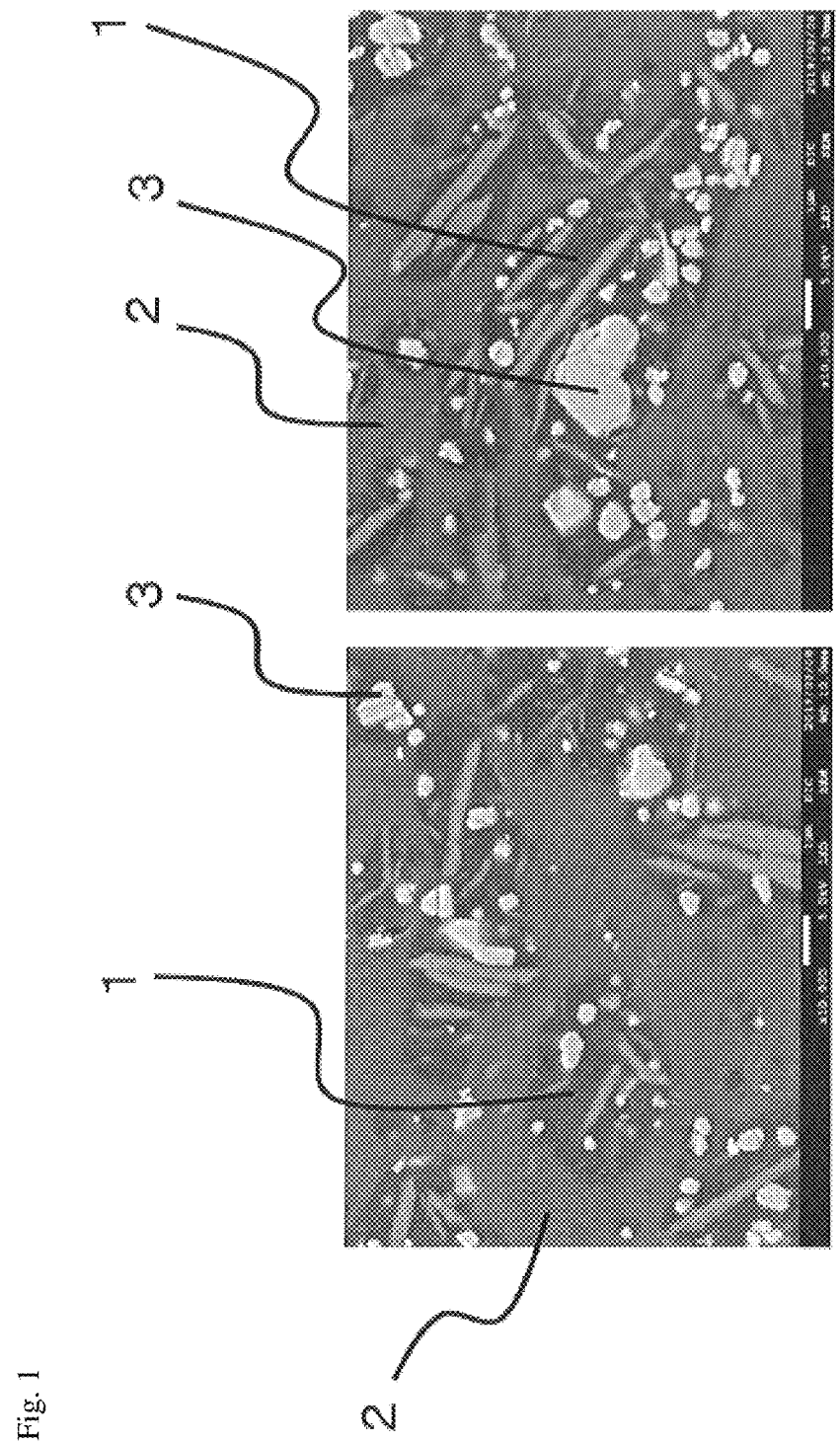
FIG. 1 presents images of a phase structure in an Example.

In the following, embodiments of the present invention are described in detail.

In an embodiment of the present invention, a molded article contains a polyarylene sulfide resin, a thermoplastic resin other than the polyarylene sulfide resin (hereinafter also referred to simply as "a thermoplastic resin"), and a metal oxide containing at least one of copper or chromium (hereinafter also referred to simply as "a metal oxide"). The polyarylene sulfide resin forms a continuous phase, and a dispersed phase containing the thermoplastic resin and the metal oxide is formed in the continuous phase.

According to this molded article, the article has superior heat resistance of a polyarylene sulfide resin, the speed of plating deposition on it is practical, and a laminate with potentially maintained adhesiveness of plating can be obtained. It is not necessarily clear why such advantages are attained, but the inventors presume it owes to the following mechanism. That is, the metal oxide heats up in response to laser irradiation, melting the resin around the metal oxide and roughening the surface of the molded article. Polyarylene sulfide resins are insusceptible to surface roughening in that process because of having high crystallinity and heat resistance, and are not easily activated as plating catalysts and do not easily come out to the surface. In this molded article, a dispersed phase contains the thermoplastic resin and the metal oxide, and the thermoplastic resin is present around the metal oxide, which means when the molded article is irradiated with a laser, it is likely that the vicinity of the metal oxide is burnt and vanished, and the metal oxide is easily activated as a plating catalyst and easily comes out to the surface, and for this reason, the inventors believe, the adhesiveness of plating on the resulting laminate is maintained while the speed of plating deposition is practical despite a molded article containing a polyarylene sulfide resin. In addition, adding a clay mineral can produce synergy with the metal oxide and make platability and the bonding strength of the plating layer even higher. It should be noted that this mechanism is merely a presumption, and even if the advantages of the present invention are produced for other reasons, this molded article is included in the technical scope of the present invention.

The molded article contains a polyarylene sulfide resin, the thermoplastic resin, and the metal oxide. In the molded article, the polyarylene sulfide resin (hereinafter also referred to as "PAS resin") forms a continuous phase. The PAS resin is one that has a resin structure in which the structure formed by an arylene and a sulfur atom bound together is the repeating unit. The PAS resin contains a repeating unit represented by formula (1) below.

[Chem. 1]

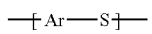
(1)

In formula (1) above, Ar is a substituted or unsubstituted arylene.

The arylene can be of any kind, but examples include phenylene, naphthylene, biphenylene, and terphenylene.

If the Ar is substituted, the substituent(s) can be of any kind, but examples include alkyl groups, such as the methyl, ethyl, propyl, isopropyl, butyl, isobutyl, sec-butyl, and tert-butyl groups; alkoxy groups, such as the methoxy, ethoxy, propyloxy, isopropyloxy, butoxy, isobutyloxy, sec-butyloxy, and tert-butyloxy groups; the nitro group; the amino group; and the cyano group.

The Ar may have one single substituent or may have two or more. If the Ar has two or more substituents, the substituents may be of the same kind or may be different from one another.

Of those PAS resins described above, it is preferred that the PAS resin be a polyphenylene sulfide resin (hereinafter also referred to as "a PPS resin"), in which the Ar is a substituted or unsubstituted phenylene. The PPS resin contains at least one repeating unit represented by formula (2) or (3) below.

[Chem. 2]

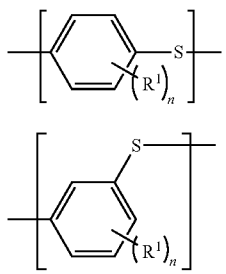

(2)

(3)

In formulae (2) and (3) above, examples of groups for each independent $R^1$ include alkyl groups, such as the methyl, ethyl, propyl, isopropyl, butyl, isobutyl, sec-butyl, and tert-butyl groups; alkoxy groups, such as the methoxy, ethoxy, propyloxy, isopropyloxy, butoxy, isobutyloxy, sec-butyloxy, and tert-butyloxy groups; the nitro group; the amino group; and the cyano group.

Furthermore, n is an integer preferably of 0 or greater, preferably of 4 or less, more preferably of 2 or less, even more preferably of 1 or less, and it is still more preferred that n be 0. n being 0 is preferred because in that case mechanical strength can be high.

Of the foregoing, it is preferred that the PPS resin contain a repeating unit represented by formula (2), for heat resistance, crystallinity, and other reasons.

Moreover, the PPS resin may contain a trifunctional structural unit represented by formula (4) below.

[Chem. 3]

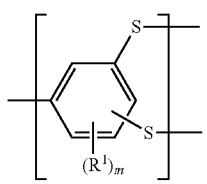

(4)

In formula (4) above, $R^1$ is as stated above.

Furthermore, m is an integer preferably of 0 or greater, preferably of 3 or less, more preferably of 2 or less, even more preferably of 1 or less, and it is still more preferred that m be 0.

In addition, if the PPS resin contains a trifunctional structural unit represented by formula (4) above, it is preferred that its percentage in the PPS resin be in the range of 0.001 mol % or more, more preferably 0.01 mol % or more, preferably 3 mol % or less, more preferably 1 mol % or less, of the total number of moles of all structural units.

Further, the PPS resin may contain a structural unit represented by formulae (5) to (9) below.

[Chem. 4]

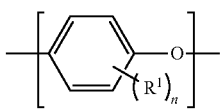

(5)

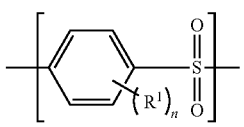

(6)

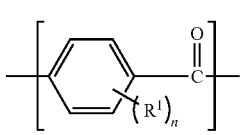

(7)

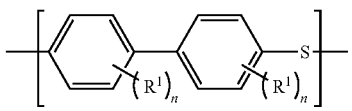

(8)

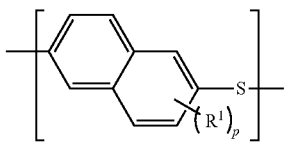

(9)

In formulae (5) to (9) above, $R^1$ and n are as stated above. Furthermore, p is an integer preferably of 0 or greater, preferably of 6 or less, more preferably of 3 or less, even more preferably of 1 or less, even more preferably of 0.

If the PPS resin contains a structural unit represented by formulae (5) to (9) above, it is preferred that its percentage in the PPS resin be 10 mol % or less, more preferably 5 mol % or less, even more preferably 3 mol % or less in relation to all structural units, for heat resistance and mechanical strength reasons. If the PPS resin contains two or more structural units represented by formulae (5) to (9) above, it is preferred that their total be such a percentage.

One such PAS resin may be used alone, or two or more may be used in combination.

The PAS resin may be linear or may be branched. It should be noted that in an embodiment, a branched PAS resin can be obtained by heating a linear one in the presence of oxygen.

The weight-average molecular weight of the PAS resin is preferably in the range of 25,000 or more, preferably 80,000 or less, even more preferably 50,000 or less. A weight-average molecular weight of 25,000 or more is preferred because in that case material strength is retained. On the other hand, a weight-average molecular weight of 80,000 or less is preferred for moldability reasons. It should be noted that a "weight-average molecular weight" value herein is that measured by gel permeation chromatography. In this context, the parameters for the gel permeation chromatography measurement are as follows. That is, HLC-8220 (Tosoh Corporation), which is a high-performance GPC, and columns (TSK-GEL GMHXL×2) are used, 200 mL of a solution of a 5-mg sample dissolved in 10 g of tetrahydrofuran (THF) is introduced into the system, and the weight-average molecular weight is measured with a refractive index (RI) detector. The flow rate, 1 mL/min (THF); the temperature of the temperature-controlled chamber, 40° C.

The melt viscosity of the PAS resin measured at 300° C. is preferably in the range of 2 Pa·s or more, more preferably 10 Pa·s or more, even more preferably 60 Pa·s or more, preferably 1000 Pa·s or less, more preferably 500 Pa·s or less, even more preferably 200 Pa·s or less. A melt viscosity of 2 Pa·s or more is preferred because in that case material strength is retained. On the other hand, a melt viscosity of 1000 Pa·s or less is preferred for moldability reasons. It should be noted that a "melt viscosity" value herein is that measured by the method described in Examples.

The non-Newtonian index of the PAS resin is preferably in the range of 0.90 or more, more preferably 0.95 or more, preferably 2.00, more preferably 1.50 or less, even more preferably 1.20 or less. A non-Newtonian index of 0.90 or more is preferred because in that case material strength is retained. On the other hand, a non-Newtonian index of 2.00 or less is preferred for moldability reasons.

The percentage of the PAS resin is preferably in the range of 20% by mass or more, more preferably 23% by mass or more, even more preferably 25% by mass or more, preferably 70% by mass or less, more preferably 60% by mass or less of the total mass of the molded article. A percentage of the PAS resin of 20% by mass or less of the total mass of the molded article is preferred because in that case material strength is retained.

In addition, for the method for producing such a PAS resin, the PAS resin can be produced by known methods. Examples include (1) methods in which a dihalogenoaromatic compound is polymerized in the presence of sulfur and sodium carbonate, optionally with a polyhalogenoaromatic compound or other ingredients for copolymerization, (2) methods in which a dihalogenoaromatic compound is polymerized in a polar solvent in the presence of, for example, a sulfidizing agent, optionally with a polyhalogenoaromatic compound or other ingredients for copolymerization, and (3) methods in which self-condensation of p-chlorothiophenol is induced, optionally with other ingredients for copolymerization. Of these methods, the methods of (2) are particularly common and preferred. Prior to the reaction, an alkali metal salt of a carboxylic or sulfonic acid may be added to adjust the degree of polymerization, or an alkali hydroxide may be added. Of those methods of (2) above, (a) methods in which a PAS resin is produced by introducing a hydrated sulfidizing agent into a heated mixture containing an organic polar solvent and a dihalogenoaromatic compound at a speed at which water can be removed from the reaction mixture, allowing the dihanogenoaromatic compound and the sulfidizing agent to react in the organic polar solvent, optionally with a polyhalogenoaromatic compound, and controlling the water content of the reaction system to the range of 0.02 moles or more and 0.5 moles or less per mole of the organic polar solvent (see Japanese Unexamined Patent Application Publication No. 07-228699) and (b) methods in which a dihalogenoaromatic compound, optionally with a polyhalogenoaromatic compound or other ingredients for copolymerization, is allowed to react with an alkali metal hydrosulfide and an alkali metal salt of an organic acid in the presence of a solid alkali metal sulfide and an aprotic polar organic solvent while controlling the amount of the alkali metal salt of an organic acid to the range of 0.01 moles or more and 0.9 moles or less per mole of the sulfur sources and the water content of the reaction system to the range of 0.02 moles per mole of the aprotic polar organic solvent (International Publication No. 2010/058713).

The dihalogenoaromatic compound can be of any kind, but examples include p-dihalobenzenes, m-dihalobenzenes, o-dihalobenzenes, 2,5-dihalotoluenes, 1,4-dihalonaphthalenes, 1-methoxy-2,5-dihalobenzenes, 4,4'-dihalobiphenyls, 3,5-dihalobenzoic acids, 2,4-dihalobenzoic acids, 2,5-dihalonitrobenzenes, 2,4-dihalonitrobenzenes, 2,4-dihaloanisoles, p,p'-dihalodiphenylethers, 4,4'-dihalobenzophenones, 4,4'-dihalodiphenylsulfones, 4,4'-dihalodiphenylsulfoxides, 4,4'-dihalodiphenylsulfides, and compounds having alkyl group(s) in which the number of carbon atoms is in the range of 1 or more and 18 or less on the aromatic ring(s) of each of these compounds. One such dihalogenoaromatic compound may be used alone, or two or more may be used in combination.

The polyhalogenoaromatic compound can be of any kind, but examples include 1,2,3-trihalobenzenes, 1,2,4-trihalobenzenes, 1,3,5-trihalobenzenes, 1,2,3,5-tetrahalobenzenes, 1,2,4,5-tetrahalobenzenes, and 1,4,6-trihalonaphthalenes. One such polyhalogenoaromatic compound may be used alone, or two or more may be used in combination.

In addition, the halogen atoms in each of these compounds are preferably chlorine or bromine atoms.

The method for the posttreatment of the PAS-containing reaction mixture obtained through the polymerization step is not critical, but examples include (1) methods in which after the end of the polymerization reaction, the solvent is removed by distillation from the reaction mixture under reduced or atmospheric pressure either directly or with an added acid or base first, then the solid left after the removal of the solvent is washed with a solvent, such as water, the reaction solvent (or an organic solvent that dissolves small polymers to a similar degree), acetone, methyl ethyl ketone, or an alcohol, once or twice or more, then the substance is neutralized, washed with water, and filtered, and the residue is dried, (2) methods in which after the end of the polymerization reaction, a solvent, such as water, acetone, methyl ethyl ketone, an alcohol, an ether, a halogenated hydrocarbon, an aromatic hydrocarbon, or an aliphatic hydrocarbon (solvent that dissolves in the polymerization solvent used and at the same time is a poor solvent for at least polyarylene sulfides) is added to the reaction mixture as a precipitator to cause the polyarylene sulfide, inorganic salts, and other solid products to settle down, and these are isolated by filtration, washed, and dried, (3) methods in which after the end of the polymerization reaction, the reaction mixture is stirred with the reaction solvent (or an organic solvent that dissolves small polymers to a similar degree), then low-molecular-weight polymers are removed by filtration, then the residue is washed with a solvent, such as water, acetone, methyl ethyl ketone, or an alcohol, once or twice or more, thereafter the substance is neutralized, washed with water, and filtered, and the residue is dried, (4) methods in which after the end of the polymerization reaction, the reaction mixture is washed with water by adding water and filtered, optionally with the mixture treated with an acid by adding an acid during washing with water, and the residue is dried, and (5) methods in which after the end of the polymerization reaction, the reaction mixture is filtered, optionally the residue is washed with the reaction solvent once or twice or more, then the substance is washed with water and filtered, and the residue dried. In posttreatment methods as described by way of example in (1) to (5) above, the drying of the polyarylene sulfide resin may be carried out in a vacuum or may be carried out in the air or in an inert gas atmosphere, such as nitrogen.

The molded article contains a thermoplastic resin other than the PAS resin as its essential ingredient. In the molded article, the thermoplastic resin forms a dispersed phase together with the metal oxide. The dispersed phase contains at least the thermoplastic resin and the metal oxide in one domain of the dispersed phase and is formed in the continuous phase.

The thermoplastic resin can be of any kind, but examples include polyester, polyamide, polyimide, polyetherimide, polycarbonate, polyphenylene ether, polysulfone, polyethersulfone, polyether ether ketone, polyether ketone, polyarylene, syndiotactic polystyrene, polyethylene, polypropylene, polyethylene tetrafluoride, polyethylene difluoride, polystyrene, acrylonitrile-butadiene-styrene (ABS), phenolic, and urethane resins and liquid-crystalline polymers. One of these extra resins may be used alone, or two or more may be used in combination. Of these, thermoplastic resins having a higher melt viscosity than the PAS resin are particularly preferred for the sake of efficient formation of a dispersed phase containing at least the thermoplastic resin and the metal oxide in the continuous phase. Examples of such thermoplastic resins include polyamide, polyetherimide, polycarbonate, polyphenylene ether, polysulfone, polyethersulfone, polyether ether ketone, polyether ketone, polyarylene, and syndiotactic polystyrene resins.

Of these thermoplastic resins, thermoplastic resins with higher laser sensitivity than the PAS resin are particularly preferred in maintaining the adhesiveness of plating on the resulting laminate while ensuring the speed of plating deposition on the resulting molded article will be practical. Examples of thermoplastic resins with higher laser sensitivity than the PAS resin are polyamide resins, and, of polyamide resins, aromatic polyamide resins are particularly preferred in imparting heat resistance to the resulting molded article and laminate. It is not necessarily clear why with a thermoplastic resin with higher laser sensitivity than the PAS resin the adhesiveness of plating on the resulting laminate will be maintained while the speed of plating deposition on the resulting molded article will be practical, but the inventors presume it owes to the following mechanism. That is, the metal oxide heats up in response to laser irradiation, melting the resin surrounding the metal oxide and roughening the surface of the molded article. By virtue of the presence of a thermoplastic resin with higher laser sensitivity than the PAS resin around the metal oxide during this, it is likely that the vicinity of the metal oxide is burnt and vanished when the molded article is irradiated with a laser, and the metal oxide is easily activated as a plating catalyst and easily comes out to the surface, and for this reason, the inventors believe, the adhesiveness of plating on the resulting laminate is maintained while the speed of plating deposition is practical despite a molded article containing the PAS resin.

Examples of aromatic polyamide resins include aromatic polyamide resins containing a repeating unit represented by structural formula (10) below.

[Chem. 5]

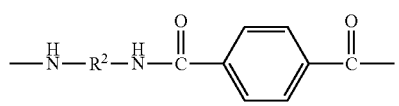

(10)

In structural formula (10) above, $R^2$ represents an alkylene group in which the number of carbon atoms is in the range of 2 or more and 12 or less. Such a terephthalic acid amide structure, specifically, is one formed by reaction between terephthalic acid or a terephthaloyl dihalide and an aliphatic diamine in which the number of carbon atoms is in the range of 2 or more and 12 or less. Specific examples of aliphatic diamines in which the number of carbon atoms is in the range of 2 or more and 12 or less that can be used here include linear aliphatic alkylenediamines, such as ethylenediamine, propanediamine, 1,4-butanediamine, 1,6-hexanediamine, 1,7-heptanediamine, 1,8-octanediamine, 1,9-nonanediamine, 1,10-decanediamine, 1,11-undecanediamine, and 1,12-dodecanediamine; branched aliphatic alkylene diamines, such as 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, and 5-methyl-1,9-nonanediamine; and alicyclic diamines, such as cyclohexanediamine, methylcyclohexanediamine, isophoronediamine, norbornanedimethylamine, and tricyclodecanedimethylamine.

Of these, linear aliphatic alkylene diamines in which the number of carbon atoms is in the range of 4 or more and 8 or less and branched aliphatic alkylene diamines in which the number of carbon atoms is in the range of 5 or more and 10 or less are particularly preferred in achieving a practical speed of plating deposition on the resulting molded article.

Examples of aromatic polyamide resins also include those containing a repeating unit represented by structural formula (11) below.

[Chem. 6]

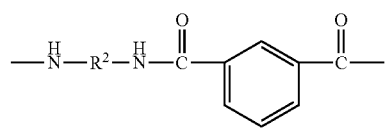

(11)

(In the formula, $R^2$ has the same meaning as $R^2$ in structural formula (10).)

Further, the aromatic polyamide resin may have an acid amide structure represented by structural formula (12) below.

[Chem. 7]

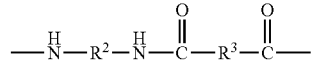

(12)

(In the formula, $R^2$ has the same meaning as $R^2$ in structural formula (10), and $R^3$ represents an aliphatic hydrocarbon group in which the number of carbon atoms is in the range of 4 or more and 10 or less.)

Here, the acid amide structure represented by structural formula (12) above is one formed by reaction between an aliphatic dicarboxylic acid in which the number of carbon atoms is in the range of 4 or more and 10 or less or its acid ester, acid anhydride, or acid halide and an aliphatic diamine in which the number of carbon atoms is in the range of 2 or more and 12 or less. Specific examples of aliphatic dicarboxylic acids in which the number of carbon atoms is in the range of 4 or more and 10 or less that can be used here include aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid, and suberic acid; and aliphatic dicarboxylic acid derivatives such as 1,3-cyclopentanedicarboxylic acid, 1,4-cyclohexanedicarboxylic acid, and similar alicyclic dicarboxylic acid.

Specific examples of acid esters of aliphatic dicarboxylic acids in which the number of carbon atoms is in the range of 4 or more and 10 or less include methyl esters, ethyl esters, and t-butyl esters, and examples of halogen atoms that can be a component of the acid halide of an aliphatic dicarboxylic acid include bromine and chlorine atoms.

As mentioned earlier, the aromatic polyamide resin is preferably one having an amide structure represented by structural formula (10), (11), or (12) above as its structural moiety. However, in achieving a practical speed of plating deposition, it is preferred that the terephthalic acid amide structure constitute 50 mol % or more, the isophthalic acid amide structure constitute 10 mol % or more, and the aliphatic hydrocarbon amide structure constitute 5 mol % or more of all acid amide structures in the aromatic polyamide resin (B) when an acid amide structure formed by one dicarboxylic acid molecule and one diamine molecule is defined as one unit.

In achieving a practical speed of plating deposition on the resulting molded article, furthermore, it is preferred that the aromatic polyamide resin be a polyamide resin composed of:
- a terephthalic acid amide structure represented by structural formula (10) above in the range of 50 mol % or more and 80 mol % or less;
- an isophthalic acid amide structure represented by structural formula (11) above in the range of 10 mol % or more and 30 mol % or less; and an acid amide structure represented by structural formula (12) above in the range of 5 mol % or more and 20 mol % or less.

In addition, the melting point is preferably in the range of 290° C. or above and 330° C. or below, and the Tg is preferably in the range of 90° C. or above and 140° C. or below as this further lowers the peak recrystallization temperature of the aromatic polyamide resin, thereby leading to good dispersibility with the PAS resin.

An aromatic polyamide resin as described above can be produced by, for example, the methods of (1) to (3) below.
(1) Interfacial polymerization, in which an acid halide of a dicarboxylic acid component containing terephthalic acid and a diamine component containing an aliphatic diamine in which the number of carbon atoms is in the range of 2 or more and 12 or less are dissolved in two solvents immiscible with each other, and then the two solutions are mixed and stirred in the presence of an alkali and a catalytic amount of quaternary ammonium salt to initiate polycondensation.
(2) Solution polymerization, in which an acid halide of a dicarboxylic acid component containing terephthalic acid and a diamine component containing an aliphatic diamine in which the number of carbon atoms is in the range of 2 or more and 12 or less are allowed to react in an organic solvent in the presence of an alkaline compound that accepts acids, such as a tertiary amine.
(3) Melt polymerization, in which with a diester of a dicarboxylic acid component containing terephthalic acid and an aromatic diamine as raw materials, transamidation is carried out in molten state.

The melt viscosity of the thermoplastic resin, when measured at 340° C., is preferably in the range of 20 Pa·s or more, more preferably 30 Pa·s or more, even more preferably 40 Pa·s or more, preferably 3000 Pa·s or less, more preferably 2000 Pa·s or less, even more preferably 1000 Pa·s or less. To form a dispersed phase that brings the advantages of the present invention, it is preferred that the melt viscosity of the thermoplastic resin be higher than the melt viscosity of the PAS resin at the melting temperature of the PAS resin, more specifically under any temperature conditions in the range of 290° C. or above and 320° C. or below. It should be noted that melt viscosity herein is measured by the method described in Examples.

The ratio between the melt viscosity of the thermoplastic resin and the melt viscosity (Pa·s) of the PAS resin at the same measuring temperature (melt viscosity (Pa·s) of the PAS resin/melt viscosity (Pa·s) of the thermoplastic resin) is preferably in the range of 1/1 or more, preferably 1/100 or less, more preferably 1/50 or less, even more preferably 1/10 or less.

The percentage of the thermoplastic resin is preferably in the range of 5% by mass or more, more preferably 10% by mass or more, preferably 40% by mass or less, more preferably 30% by mass or less of the total mass of the molded article. A percentage of the thermoplastic resin of 5% by mass or less of the total mass of the molded article is preferred because in that case the speed of plating deposition on the resulting molded article will be improved. For the adhesiveness of plating on the resulting laminate, it is preferred that the percentage of the thermoplastic resin be 40% by mass or less.

In the molded article, it is preferred that the proportions of the PAS resin and the thermoplastic resin be the proportions that make the ratio by mass of the PAS resin/the thermoplastic resin 50/50 or more and 95/5 or less, in maintaining the adhesiveness of plating on the resulting laminate while ensuring the speed of plating deposition on the resulting molded article will be practical and as this makes the heat resistance and water repellency of the laminate good. It is, furthermore, preferred that the ratio by mass of the PAS resin/the thermoplastic resin be in the range of 60/40 or more and 90/10 or less as this makes not only the speed of plating deposition on the resulting molded article and the plating adhesiveness, heat resistance, and water resistance of the resulting laminate but also flame retardancy good.

The molded article contains a metal oxide containing at least one of copper or chromium as its essential ingredient. The metal oxide, together with the thermoplastic resin, forms the dispersed phase. In the resulting molded article, the metal oxide has functions such as heating up by being irradiated with a laser and roughening the surface of the molded article by melting, for example, the PAS resin and becoming activated in response to laser irradiation and forming a plating layer selectively.

The metal oxide contains at least one of copper or chromium. Furthermore, the metal oxide may further contain other metals, such as iron, aluminum, gallium, boron, molybdenum, tungsten, and selenium.

The metal oxide can be of any kind, but specific examples include $CuFe_{0.5}B_{0.5}O_{2.5}$, $CuAl_{0.5}B_{0.5}O_{2.5}$, $CuGa_{0.5}B_{0.5}O_{2.5}$, $CuB_2O_4$, $CuB_{0.7}O_2$, $CuMo_{0.7}O_3$, $CuMo_{0.5}O_{2.5}$, $CuMo_{0.4}$, $CuWO_4$, $CuSeO_4$, and $CuCr_2O_4$. Of these, it is preferred that the metal oxide be $CuCr_2O_4$, $CuFe_{0.5}B_{0.5}O_{2.5}$, or $CuAl_{0.5}B_{0.5}O_{2.5}$, more preferably $CuCr_2O_4$ or $CuFe_{0.5}B_{0.5}O_{2.5}$. One of these metal oxides may be used alone, or two or more may be used in combination.

The average diameter of particles of the metal oxide is preferably in the range of 0.01 μm or more, more preferably 0.05 μm or more, preferably 50 μm or less, more preferably 30 μm or less. An average diameter of particles of the metal oxide of 0.01 μm or more is preferred because it allows for efficient stable production. On the other hand, an average diameter of particles of the metal oxide of 50 μm is preferred because in that case material strength is retained. It should be noted that an "average diameter of particles of a metal oxide" herein represents the number-average diameter of the particles and is that measured by electron microscopic imaging. Specifically, the diameter of randomly selected 100 particles of the metal oxide in one field of view of an electron microscope is measured, and the average is calculated.

Furthermore, the Mohs hardness of the metal oxide is preferably in the range of 4.0 or more, preferably 6.5 or less, more preferably 6.0 or less.

The amount of the metal oxide is preferably in the range of 15 parts by mass or more, more preferably 20 parts by mass or more, even more preferably 25 parts by mass or more, preferably 90 parts by mass or less per 100 parts by mass of the above-described PAS resin. An amount of the metal oxide of 15 parts by mass or more per 100 parts by mass of the PAS resin is preferred because in that case, for example, the roughening of the surface of, and the activation of the metal oxide in, the resulting molded article by laser irradiation can be extensive, and the molded article will be superior in platability. On the other hand, an amount of the metal oxide of 90 parts by mass or less per 100 parts by mass of the PAS resin is preferred because in that case material strength is retained.

The amount of the metal oxide is preferably in the range of 30 parts by mass or more, more preferably 40 parts by mass or more, even more preferably 50 parts by mass or more, 200 parts by mass or less, more preferably 180 parts by mass or less, even more preferably 160 parts by mass or less per 100 parts by mass of the above-described thermoplastic resin. An amount of the metal oxide of 30 parts by mass or more per 100 parts by mass of the thermoplastic resin is preferred because in that case, for example, the roughening of the surface of, and the activation of the metal oxide in, the resulting molded article by laser irradiation can be extensive, and the molded article will be superior in platability. On the other hand, an amount of the metal oxide of 90 parts by mass or less per 100 parts by mass of the thermoplastic resin is preferred because in that case material strength is retained.

In an embodiment, the molded article can contain at least one clay mineral as its optional ingredient. The clay mineral has the function of improving the platability of the resulting molded article and the bonding strength of the plating layer in synergy with the above-described metal oxide. In achieving a practical speed of plating deposition on the resulting molded article, it is preferred that the clay mineral be more abundant in the dispersed phase like the metal oxide.

As the clay mineral, a layered and cleavable one is used. Such a clay mineral can be of any kind, but examples include carbonate minerals and silicate minerals. That is, in an embodiment of the present invention, the clay mineral includes at least one of a carbonate mineral or a silicate mineral.

Examples of carbonate minerals include the hydrotalcite, calcite, and dolomite groups of carbonate minerals.

In the hydrotalcite group any kind of carbonate mineral can be used, but examples include hydrotalcite, pyroaurite, hydrotalcite, stichtite, desautelsite, stichtite, takovite, and wermlandite.

In the calcite group any kind of carbonate mineral can be used, but examples include calcite, magnesite, siderite, rhodochrosite, smithsonite, spherocobaltite, gaspeite, and otavite.

In the dolomite group any kind of carbonate mineral can be used, but examples include dolomite, ankerite, kutnohorite, minrecordite, and norsethite.

Examples of silicate minerals include phyllosilicate clay minerals, such as the kaolinite, talc, smectite, vermiculite, mica, and chlorite groups of silicate minerals and interstratified silicate minerals; and tectosilicate minerals, such as the feldsper and zeolite groups of silicate minerals.

In the kaolinite group any kind of silicate mineral can be used, but examples include kaolinite, dickite, nacrite, halloysite, antigorite, chrysotile, lizardite, amesite, kellyite, berthierine, greenalite, nepouite, brindleyite, fraipontite, odinite, cronstedtite, manandonite, and pecoraite.

In the talc group any kind of silicate mineral can be used, but examples include talc, willemseite, kerolite, pimelite, pyrophyllite, and ferripyrophyllite.

In the smectite group any kind of silicate mineral can be used, but examples include saponite, hectorite, sauconite, stevensite, swinefordite, montmorillonite, beidellite, nontronite, and volkonskoite.

In the vermiculite group any kind of silicate mineral can be used, but examples include vermiculite.

In the mica group any kind of silicate mineral can be used, but examples include biotite, phlogopite, annite, eastonite, siderophyllite, tetraferriannite, lepidolite, polylithionite, muscovite, celadonite, ferroceladonite, ferroaluminoceladonite, aluminoceladonite, tobelite, paragonite, illite, glauconite, brammallite, wonesite, clintonite, kinoshitalite, bityite, anandite, and margarite.

In the chlorite group any kind of silicate mineral can be used, but examples include clinochlore, chamosite, pennantite, nimite, baileychlore, donbassite, cookeite, and sudoite.

In the interstratified mineral group any kind of silicate mineral can be used, but examples include corrensite, hydrobiotite, aliettite, kulkeite, rectorite, tosudite, dozyite, lunijianlaite, and saliotite.

In the feldsper group any kind of silicate mineral can be used, but examples include orthoclase, sanidine, microcline, anorthoclase, oligoclase, andesine, labradorite, bytownite, albite, anorthite, labradorite, sunstone, celsian, paracelsian, banalsite, stronalsite, slawsonite, and buddingtonite.

In the zeolite group any kind of silicate mineral can be used, but examples include amicite, analcime, barrerite, bellbergite, bikitaite, boggsite, brewsterite, chabazite, chiavennite, clinoptilolite, cowlesite, dachiardite, edingtonite, epistilbite, erionite, faujasite, ferrierite, garronite, gaultite, gismondine, gmelinite, gobbinsite, gonnardite, goosecreekite, gottardiite, harmotome, heulandite, hsianghualite, kalborsite, laumontite, levyne, lovdarite, maricopaite, mazzite, merlinoite, mesolite, montesommaite, mordenite, mutinaite, natrolite, offretite, pahasapaite, parthéite, paulingite, perlialite, phillipsite, pollucite, rogginite, scolecite, stellerite, stilbite, terranovaite, thomsonite, tschernichite, tschortnerite, wairakite, weinebeneite, willhendersonite, and yugawaralite.

Of these, it is preferred that the clay mineral be a silicate mineral, more preferably a phyllosilicate clay mineral, even more preferably a silicate mineral in the kaolinite, talc, smectite, vermiculite, or mica group, in particular kaolinite, talc, kerolite, pimelite, pyrophyllite, saponite, hectorite, montmorillonite, vermiculite, biotite, phlogopite, annite, muscovite, glauconite, or margarite, the most preferably talc, kerolite, pimelite, or pyrophyllite.

One such clay mineral may be used alone, or two or more may be used in combination.

The amount of the clay mineral is preferably in the range of 3 parts by mass or more, more preferably 6 parts by mass or more, even more preferably 9 parts by mass or more, preferably 60 parts by mass or less, more preferably 55 parts by mass or less, even more preferably 50 parts by mass or less per 100 parts by mass of the above-described PAS resin. An amount of the clay mineral of 3 parts by mass or more per 100 parts by mass of the PAS resin is preferred because in that case surface roughening and the activation of the metal oxide are efficient. On the other hand, an amount of the clay mineral of 60 parts by mass or less per 100 parts by mass of the PAS resin is preferred because in that case material strength is retained.

The amount of the clay mineral is preferably in the range of 20 parts by mass or more, more preferably 25 parts by mass or more, even more preferably 30 parts by mass or more, preferably 100 parts by mass or less, more preferably 90 parts by mass or less, even more preferably 80 parts by mass or less per 100 parts by mass of the above-described thermoplastic resin. An amount of the clay mineral of 20 parts by mass or more per 100 parts by mass of the thermoplastic resin is preferred because in that case surface roughening and the activation of the metal oxide are efficient. On the other hand, an amount of the clay mineral of 100 parts by mass or less per 100 parts by mass of the thermoplastic resin is preferred because in that case material strength is retained.

The amount of the clay mineral is preferably in the range of 10 parts by mass or more, more preferably 20 parts by mass or more, even more preferably 30 parts by mass or more, preferably 100 parts by mass or less, more preferably 80 parts by mass or less, even more preferably 60 parts by mass or less per 100 parts by mass of the above-described metal oxide. An amount of the clay mineral in this mass range per 100 parts by mass of the metal oxide is preferred because in that case surface roughening and the activation of the metal oxide are efficient as a result of synergy. On the other hand, a clay mineral content of 100 parts by mass or less per 100 parts by mass of the metal oxide is preferred because in that case material strength is retained.

The Mohs hardness of the clay mineral is preferably in the range of 1.0 or more, preferably 2.5 or less, more preferably 2.0 or less. By adjusting the Mohs hardness of the materials in the molded article, the breakage, for example, of mixed material during melting and kneading can be prevented or reduced.

In an embodiment, the molded article can contain glass fiber as its optional ingredient.

The glass fiber is a form of glass melted and drawn into fiber. In this context, "glass fiber" includes a bundle of multiple strands of glass fiber and a workpiece in a predetermined shape.

If the glass fiber is a bundle or workpiece, the number of strands of glass fiber is not critical, but preferably is 100 or more, more preferably 150 or more, preferably 5000 or less, more preferably 4000 or less. Glass fiber made as a bundle of 100 or more strands is preferred because in that case the mechanical strength of the molded article resulting from the use of the glass fiber can further improve. Glass fiber made as a bundle of 5000 or less strands is preferred because in that case mechanical strength can further improve as the glass fiber disperses well in the molded article.

Furthermore, the glass fiber may have a treated surface.

The surface treatment agent with which the surface of the glass fiber is treated can be of any kind, but examples include silane coupling agents, such as γ-methacryloxypropyltrimethoxysilane, γ-glycidoxypropyltrimethoxysilane, and γ-aminopropyltriethoxysilane.

If the surface of the glass fiber is treated, it is preferred that the amount of surface treatment agent attached be preferably in the range of 0.01% by mass or more and 1% by mass or less of the mass of the glass fiber.

The chemical makeup of the raw material glass from which the glass fiber is made is not critical, but preferably the glass is E-, C-, S-, or D-glass, more preferably E- or S-glass, even more preferably E-glass. Raw material glass in one of these categories may be used alone, or those in two or more categories may be used in combination.

The average diameter of the glass fiber is preferably in the range of 1 μm or more, preferably 30 μm or less, more preferably 20 μm or less. An average diameter of the glass fiber of 30 μm or less is preferred because in that case the characteristics of the resulting molded article, such as strength, rigidity, rigidity under heat stress, and strength against impact, can be high. It should be noted that an "average diameter of a strand of glass fiber" herein refers to the maximum diameter of a cross-section of the strand of glass fiber (cross-section perpendicular to the direction of drawing of the glass fiber), and an "average dimeter of glass fiber" value is that determined by observing the glass fiber under an optical microscope and measuring the average diameter of each of any 500 strands of the glass fiber in one field of view. The mean of the measured average diameters is used.

The length of the glass fiber is preferably in the range of 100 μm or more, more preferably 120 μm or more, and preferably 800 μm or less, more preferably 500 μm or less. A length of the glass fiber of 100 μm or more is preferred because in that case material strength is retained. A length of the glass fiber of 500 μm or less is preferred for moldability reasons. It should be noted that a "length of a strand of glass fiber" herein refers to the maximum length of the strand of glass fiber in the direction of drawing, and a "length of glass fiber" value is that determined by observing the glass fiber under an optical microscope and measuring the length of each of any 500 strands of the glass fiber in one field of view. The mean of the measured lengths is used.

The aspect ratio (length/average diameter) of the glass fiber is preferably in the range of 1.0 or more, more preferably 2.0 or more, even more preferably 2.5 or more, in particular 3.0 or more, preferably 100.0 or less, more preferably 90.0 or less, even more preferably 80.0 or less. An aspect ratio of the glass fiber of 1.0 or more is preferred because in that case material strength is retained. An aspect ratio of the glass fiber of 100.0 or less is preferred for moldability reasons.

The maximum cross-sectional area length of the glass fiber is preferably in the range of 7 μm or more, more preferably 10 μm or more, preferably 50 μm or less, more preferably 40 μm or less. A maximum cross-sectional area length of the glass fiber of 7 μm or more is preferred because in that case material strength is retained. A maximum cross-sectional area length of the glass fiber of 50 μm or less is preferred for moldability reasons. It should be noted that a "maximum cross-sectional area length of glass fiber" herein refers to the largest length of the distances between two points on the contour of ten cross-sections perpendicular to the longitudinal axis of the glass fiber.

Furthermore, the minimum cross-sectional area length of the glass fiber is preferably in the range of 3 μm or more, more preferably 5 μm or more, preferably 20 μm or less, more preferably 15 μm or less. A minimum cross-sectional area length of the glass fiber of 3 μm or more is preferred because in that case material strength is retained. A minimum cross-sectional area length of the glass fiber of 20 μm or less is preferred for moldability reasons. It should be noted that a "minimum cross-sectional area length of glass fiber" herein refers to the shortest length of the distances between two points on the contour of ten cross-sections perpendicular to the longitudinal axis of the glass fiber.

The ratio of the maximum cross-sectional area length of the glass fiber to the minimum cross-sectional area length of the glass fiber (maximum length/minimum length) is preferably in the range of 1 or more, preferably 17 or less, more preferably 10 or less. This ratio (maximum length/minimum length) being 1 or more is preferred for dimensional stability reasons. This ratio (maximum length/minimum length) being 17 or less is preferred for moldability reasons.

Examples of shapes the glass fiber can have include needles, rods, sheets, and spheres. That is, in an embodiment of the present invention, the glass fiber includes at least one shape selected from the group consisting of needles, rods, sheets, and spheres. Of these, it is preferred that the glass fiber be needle-shaped, rod-shaped, sheet-shaped, or columnar, more preferably needle- or rod-shaped, even more preferably rod-shaped.

It should be noted that "needles" herein refers to strands having a thin and pointed shape in terms of external shape with the cross-sectional diameter (maximum) at their end being smaller than the average diameter of the glass fiber by 2 μm or more. Furthermore, "rods" refers to strands having a triangular prismatic, rectangular prismatic, pentagonal prismatic, hexagonal prismatic, columnar, or similar shape in terms of external shape with the ratio of the maximum cross-sectional area length of the glass fiber to the minimum cross-sectional area length (maximum length/minimum length) being less than 2. For example, if the glass fiber has a columnar shape and if the minimum cross-sectional area length of the glass fiber is 1 μm with the maximum cross-sectional area length of the glass fiber being 1 μm, the glass fiber is rod-shaped because the aspect ratio, the aforementioned ratio (maximum length/minimum length), is 1.0. Moreover, "sheets" refers to strands having a triangular prismatic, rectangular prismatic, pentagonal prismatic, hexagonal prismatic, columnar, or similar shape in terms of external shape with the ratio of the maximum cross-sectional area length of the glass fiber to the minimum cross-sectional area length (maximum length/minimum length) being 2 or more. For example, if the glass fiber has a columnar shape and if the minimum cross-sectional area length of the glass fiber is 1 μm with the maximum cross-sectional area length of the glass fiber being 2 μm, the glass fiber is sheet-shaped because the aspect ratio is 2.0. Further, "spheres" refers to strands having a perfectly spherical or analogous shape (e.g., ellipsoidal) in terms of external shape with no area of contact between two planes. It should be noted that if part of the glass fiber is in a special shape, for example if part of the glass fiber has projections or if part of the glass fiber has a curved surface on a triangular prismatic general shape, this special shape is ignored in the determination of the shape of the glass fiber.

The amount of the glass fiber is preferably in the range of 20 parts by mass or more, more preferably 30 parts by mass or more, even more preferably 40 parts by mass or more, preferably 100 parts by mass or less, more preferably 90 parts by mass or less, even more preferably 85 parts by mass or less per 100 parts by mass of the above-described PAS resin. An amount of the glass fiber of 20 parts by mass or more per 100 parts by mass of the PAS resin is preferred because in that case material strength is retained. On the other hand, an amount of the glass fiber of 100 parts by mass or less per 100 parts by mass of the PAS resin is preferred for moldability reasons.

The Mohs hardness of the glass fiber is preferably in the range of 5.5 or more, preferably 8.0 or less, more preferably 7.5 or less. A Mohs hardness of the glass fiber of 5.5 or more is preferred because in that case material strength is retained.

In addition, the difference between the Mohs hardness of the glass fiber and the Mohs hardness of the metal oxide (the Mohs hardness of the glass fiber minus the Mohs hardness of the metal oxide) is preferably in the range of 0.1 or more, preferably less than 1.5, more preferably 1.4 or less. This difference in Mohs hardness being less than 1.5 is preferred because in that case shortening of the glass fiber caused by contact of the metal oxide with the glass fiber is prevented, and the resulting molded article can have high mechanical properties (flexural strength, flexural modulus, tensile strength, tensile modulus, etc.).

In an embodiment, the molded article can even contain filler as its optional ingredient. The filler has functions such as imparting mechanical strength to the molded article.

The filler can be of any kind, but examples include fibrous fillers, such as carbon fiber, silane glass fiber, ceramic fiber, aramid fiber, metal fiber, potassium titanate fiber, silicon carbide fiber, and calcium silicate (wollastonite); and non-fibrous fillers, such as glass beads, glass flakes, barium sulfate, clay, pyrophyllite, bentonite, sericite, attapulgite, ferrite, calcium silicate, calcium carbonate, magnesium carbonate, glass beads, zeolite, and calcium sulfate. One of these fillers may be used alone, or two or more may be used in combination.

The percentage of the filler is preferably in the range of 0.01% by mass or more, more preferably 0.1% by mass or more, preferably 10% by mass or less, more preferably 5% by mass or less of the total mass of the molded article.

In an embodiment, the molded article can contain a silane coupling agent as its optional ingredient. The silane coupling agent has functions such as imparting intermaterial adhesiveness to the molded article.

Examples of silane coupling agents include epoxy-containing alkoxysilane compounds, such as γ-glycidoxypropyltrimethoxysilane, γ-glycidoxypropyltriethoxysilane, and β-(3,4-epoxycyclohexyl)ethyltrimethoxysilane; isocyanato-containing alkoxysilane compounds, such as γ-isocyanatopropyltrimethoxysilane, γ-isocyanatopropyltriethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane, and γ-isocyanatopropyltrichlorosilane; amino-containing alkoxysilane compounds, such as γ-(2-aminoethyl)aminopropylmethyldimethoxysilane, γ-(2-aminoethyl)aminopropyltrimethoxysilane, and γ-aminopropyltrimethoxysilane; and hydroxyl-containing alkoxysilane compounds, such as γ-hydroxypropyltrimethoxysilane and γ-hydroxypropyltriethoxysilane. One of these silane coupling agent may be used alone, or two or more may be used in combination.

The percentage of the silane coupling agent is preferably in the range of 0.01% by mass or more, more preferably 0.1% by mass or more, preferably 10% by mass or less, more preferably 5% by mass or less of the total mass of the molded article.

In an embodiment, the molded article may contain a resin other than the PAS resin and the thermoplastic resin as its optional ingredient. Examples include a thermoplastic elastomer, an epoxy resin, and a silicone resin.

In an embodiment, the molded article can contain a thermoplastic elastomer as its optional ingredient. The thermoplastic elastomer is a resin used to give impact resistance or likewise functionalize the PAS resin that forms the continuous phase and may be formed as a dispersed phase in the continuous phase, but preferably without containing the metal oxide. In this regard, the thermoplastic elastomer is distinguished from the essential thermoplastic resin.

The thermoplastic elastomer used to give impact resistance or likewise functionalize the PAS resin that forms the continuous phase can be of any kind, but examples include polyolefin thermoplastic elastomers, thermoplastic fluoroelastomers, silicone thermoplastic elastomers, and styrene thermoplastic elastomers.

Examples of polyolefin thermoplastic elastomers that can be used to give impact resistance or likewise functionalize the PAS resin that forms the continuous phase include homopolymers of α-olefins, copolymers of two or more α-olefins, and copolymers of one or two or more α-olefins and at least one polymerizable vinyl compound having a functional group. In this context, examples of α-olefins include α-olefins in which the number of carbon atoms is in the range of 2 or more and 8 or less, such as ethylene, propylene, and 1-butene. Furthermore, examples of functional groups include the carboxy, acid anhydride (—C(=O)OC(=O)—), epoxy, amino, hydroxyl, mercapto, isocyanate, and oxazoline groups, and the polymerizable vinyl compound having a functional group can be, for example, one or two or more of compounds like vinyl acetate; α,β-unsaturated carboxylic acids, such as (meth)acrylic acid; alkyl esters of α,β-unsaturated carboxylic acids, such as methyl acrylate, ethyl acrylate, and butyl acrylate; metal salts of α,β-unsaturated carboxylic acids, such as ionomers (the metal can be, for example, an alkaline metal, such as sodium, an alkaline earth metal, such as calcium, or zinc); glycidyl esters of α,β-unsaturated carboxylic acids, such as glycidyl methacrylate, and analogues; α,β-unsaturated dicarboxylic acids, such as maleic acid, fumaric acid, and itaconic acid; and derivatives of the α,β-unsaturated dicarboxylic acids (monoesters, diesters, and acid anhydrides).

One such thermoplastic elastomer may be used alone, or two or more may be used in combination.

The percentage of the thermoplastic elastomer used to give impact resistance or likewise functionalize the PAS resin that forms the continuous phase is preferably in the range of 0.01% by mass or more, more preferably 0.1% by mass or more, preferably 10% by mass or less, more preferably 5% by mass or less of the total mass of the PAS resin.

In an embodiment, the molded article can contain an epoxy resin as its optional ingredient. The epoxy resin is a resin used to impart adhesiveness to epoxy resins or likewise functionalize the molded article and may be formed as a dispersed phase in the continuous phase, but preferably without containing the metal oxide. In this regard, the epoxy resin is distinguished from the essential thermoplastic resin. The epoxy resin can be of any kind unless it impairs the advantages of the present invention, and examples include bisphenol epoxy resins, novolac epoxy resins, and epoxy resins having a polyarylene ether structure (a). Of these, examples of preferred ones include bisphenol epoxy resins because they are superior in adhesiveness.

If an epoxy resin is used in the present invention, its percentage is not critical unless the advantages of the present invention are impaired, but preferably the percentage of the epoxy resin is in the range of 0.01 to 20 parts by mass, more preferably in the range of 0.5 to 10 parts by mass, per 100 parts by mass of the PAS resin.

In an embodiment, the molded article can contain a silicone resin as its optional ingredient. The silicone resin is a resin used to impart adhesiveness to silicone resins or likewise functionalize the molded article and may be formed as a dispersed phase in the continuous phase, but preferably without containing the metal oxide. In this regard, the silicone resin is distinguished from the essential thermoplastic resin. This silicone resin is a polymer whose backbone is formed by dimethylsiloxane (—Si(CH$_3$)$_2$—O—) bonds, and the Si atoms may have organic groups besides the methyl groups. Examples of such organic groups include alkenyl groups in which the number of carbon atoms is between 2 and 8, such as the vinyl, allyl, 1-butenyl, and 1-hexenyl groups. Preferably, the organic groups are vinyl or allyl groups, in particular vinyl groups. Such alkenyl groups may be bound with the Si atoms at the ends of the molecular chain or may be bound with Si atoms in the middle of the molecular chain. With respect to the speed of curing reaction, it is preferred that the silicone resin be an alkenyl-containing polyorganosiloxane having the alkenyl groups only at the terminal silicone atoms. Preferably, the dimethylpolysiloxane is a linear dimethylpolysiloxane. The silicone resin may be a commercially available one or may be one synthesized as needed. Specific examples include silicone rubber particles like KMP-597, KMP-598, KMP-594, and X-52-875 (Shin-Etsu Chemical Co., Ltd.); silicone composite particles like KMP-605 and X-52-7030 (Shin-Etsu Chemical Co., Ltd.); and silica-impregnated materials like GENIOPLAST® Pellet S (Wacker Asahikasei Silicone Co., Ltd.).

If a silicone resin is used in the present invention, its percentage is not critical unless the advantages of the present invention are impaired, but preferably the percentage of the silicone resin is in the range of 0.01 to 20 parts by mass, more preferably in the range of 0.05 to 10 parts by mass, per 100 parts by mass of the PAS resin.

In an embodiment, the molded article may contain known additives as its optional ingredients.

The additives can be of any kind, but examples include a coloring agent, an antistatic agent, an antioxidant, a heat stabilizer, an ultraviolet stabilizer, an ultraviolet absorber, a foaming agent, a flame retardant, a flame retardant aid, an antirust, a release agent, a nucleator, and a crystallization retardant. One of these additives may be used alone, or two or more may be used in combination.

The molded article contains the PAS resin, the thermoplastic resin, and the metal oxide with the optional ingredients as needed. The molded article contains components derived from the PAS resin, the thermoplastic resin other than the PAS resin, the metal oxide containing at least one of copper or chromium, and the optional ingredients contained as needed. The molded article is obtained by melting and molding the resin composition described below, in which the PAS resin forms a continuous phase, and a dispersed phase containing the thermoplastic resin and the metal oxide is formed in the continuous phase. This means that in the resin composition, too, the PAS resin forms a continuous phase, and a dispersed phase containing the thermoplastic resin and the metal oxide is formed in the continuous phase.

The size of the dispersed phase formed in the continuous phase is larger than the diameter of particles of the metal oxide, but the smaller, the better for improving the strength of the resin itself, the speed of plating deposition on the resulting molded article, and the adhesiveness of plating on the resulting laminate. The average size of the dispersed phase is preferably in the range of 1 µm or more, preferably 30 µm or less, more preferably 20 µm or less, even more preferably 10 µm or less. The average size of the dispersed phase can be measured on an observation image of a cross-section of the resulting molded article by an electron microscope, and an example is to measure the major axis of the cross-section of each domain of the dispersed phase for ten or more domains in a range of observation with each side measuring 10 to 100 times the size of the dispersed phase and determine the average.

For the metal oxide in the molded article, it is preferred that 0% or more, preferably less than 30%, more preferably less than 20%, even more preferably less than 10% of the metal oxide contained be present in the continuous phase. In other words, for the metal oxide in the molded article, it is preferred that 70% or more, more preferably 80% or more, even more preferably 90% or more of the metal oxide contained be present in the dispersed phase formed by the thermoplastic resin. It should be noted that for the metal oxide in the molded article, 0% of the metal oxide contained being present in the continuous phase means all of the metal oxide contained in the molded article is present in the dispersed phase formed by the thermoplastic resin. The distribution of the metal oxide in the molded article is measured by the method described in Examples. Furthermore, the metal oxide and the thermoplastic resin are deemed to have formed a dispersed phase as long as at least part of the surface of the metal oxide is in contact with the thermoplastic resin.

The molded article can have a roughened surface, a surface roughened on at least part of its surface. The arithmetic average roughness (Ra) of the roughened surface is not critical, but preferably is in the range of 2.8 µm or more, more preferably 3.0 µm or more, even more preferably 3.2 µm or more, preferably 5.0 µm or less, more preferably 4.9 µm or less. An arithmetic average roughness (Ra) of the roughened surface of 2.8 µm or more is preferred because in that case the surface is easy to plate. On the other hand, an arithmetic average roughness (Ra) of the roughened surface of 5.0 µm or less is preferred because in that case it is easy to produce a solder resist layer. It should be noted that a "roughened surface" herein refers to a surface of the molded article that has a roughened surface. Therefore, for example, if the molded article has two separate roughened regions on one single surface, the roughened regions are not different roughened surfaces, but the single surface including the two roughened regions is a roughened surface.

As described later, the roughened surface is usually formed by carrying out laser irradiation. Hence, on the roughened surface, at least part of activated metal oxide is exposed. The exposed metal oxide has high platability.

In addition, the molded article may have two or more roughened surfaces.

The shape of the roughened surface is not critical. The shape of the roughened surface can be any of a circle, a polygon (triangle, rectangle, or pentagon), straight lines, etc., and can even be a complicated shape, for example of circuitry.

The shape of the molded article can be adjusted as needed according to the application in which the article will be used.

According to a form of the present invention, there is provided a polyarylene sulfide resin composition (hereinafter also referred to as "a PAS resin composition") for use in the above molded article.

In an embodiment, the PAS resin composition is a PAS resin composition for use in the above molded article and contains a PAS resin, a thermoplastic resin other than the PAS resin, and a metal oxide containing at least one of copper or chromium, all as described above. The PAS resin forms a continuous phase, and a dispersed phase containing the thermoplastic resin and the metal oxide is formed in the continuous phase.

According to this PAS resin composition, the resin composition has superior heat resistance of a PAS resin, the speed of plating deposition on it is practical, and a laminate with potentially maintained adhesiveness of plating can be obtained. It is not necessarily clear why such advantages are attained, but the inventors presume it owes to the following mechanism. That is, the metal oxide heats up in response to laser irradiation, melting the resin around the metal oxide and roughening the surface of the molded article. PAS resins are insusceptible to surface roughening in that process because of having high crystallinity and heat resistance, and are not easily activated as plating catalysts and do not easily come out to the surface. In this PAS resin composition, a dispersed phase contains the thermoplastic resin and the metal oxide, and the thermoplastic resin is present around the metal oxide, which means when the resin composition is irradiated with a laser, it is likely that the vicinity of the metal oxide is burnt and vanished, and the metal oxide is easily activated as a plating catalyst and easily comes out to the surface, and for this reason, the inventors believe, the adhesiveness of plating on the resulting laminate is maintained while the speed of plating deposition is practical despite a molded article containing a PAS resin. In addition, adding a clay mineral can produce synergy with the metal oxide and make platability and the bonding strength of the plating layer even higher. It should be noted that this mechanism is merely a presumption, and even if the advantages of the present invention are produced for other reasons, this PAS resin composition is included in the technical scope of the present invention.

The percentage of the PAS resin in the PAS resin composition is preferably in the range of 20% by mass or more, more preferably 23% by mass or more, even more preferably 25% by mass or more, preferably 70% by mass or less, more preferably 60% by mass or less of the total mass of the PAS resin composition. A percentage of the PAS resin of 20% by mass or less of the total mass of the PAS resin composition is preferred because in that case material strength is retained.

The percentage of the thermoplastic resin in the PAS resin composition is preferably in the range of 5% by mass or more, more preferably 10% by mass or more, preferably 40% by mass or less, more preferably 30% by mass or less of the total mass of the PAS resin composition. A percentage of the thermoplastic resin of 5% by mass or less of the total mass of the PAS resin composition is preferred because in that case the speed of plating deposition on the resulting molded article will be improved. For the adhesiveness of plating on the resulting laminate, it is preferred that the percentage to the total mass of the PAS resin composition be 40% by mass or less.

In the PAS resin composition, it is preferred that the proportions of the PAS resin and the thermoplastic resin be the proportions that make the ratio by mass of the PAS resin/the thermoplastic resin 50/50 or more and 95/5 or less, in maintaining the adhesiveness of plating on the resulting laminate while ensuring the speed of plating deposition on the resulting molded article will be practical and as this makes the heat resistance and water repellency of the laminate good. It is, furthermore, preferred that the ratio by mass of the PAS resin/the thermoplastic resin be in the range of 60/40 or more and 90/10 or less as this makes not only the speed of plating deposition on the resulting molded article and the plating adhesiveness, heat resistance, and water resistance of the resulting laminate but also flame retardancy good.

The amount of the metal oxide in the PAS resin composition is preferably in the range of 15 parts by mass or more, more preferably 20 parts by mass or more, even more preferably 25 parts by mass or more, preferably 90 parts by mass or less per 100 parts by mass of the above-described PAS resin. An amount of the metal oxide of 15 parts by mass or more per 100 parts by mass of the PAS resin is preferred because in that case, for example, the roughening of the surface of, and the activation of the metal oxide in, the resulting molded article by laser irradiation can be extensive, and the molded article will be superior in platability. On the other hand, an amount of the metal oxide of 90 parts by mass or less per 100 parts by mass of the PAS resin is preferred because in that case material strength is retained.

The amount of the metal oxide in the PAS resin composition is preferably in the range of 30 parts by mass or more, more preferably 40 parts by mass or more, even more preferably 50 parts by mass or more, 200 parts by mass or less, more preferably 180 parts by mass or less, even more preferably 160 parts by mass or less per 100 parts by mass of the above-described thermoplastic resin. An amount of the metal oxide of 30 parts by mass or more per 100 parts by mass of the thermoplastic resin is preferred because in that case, for example, the roughening of the surface of, and the activation of the metal oxide in, the resulting molded article by laser irradiation can be extensive, and the molded article will be superior in platability. On the other hand, an amount of the metal oxide of 90 parts by mass or less per 100 parts by mass of the thermoplastic resin is preferred because in that case material strength is retained.

The PAS resin composition can contain a clay mineral, glass fiber, an extra resin, filler, a silane coupling agent, a thermoplastic elastomer, and additives, all as described above, as its optional ingredients. The PAS resin composition contains components derived from the PAS resin, the thermoplastic resin other than the PAS resin, the metal oxide containing at least one of copper or chromium, and the optional ingredients contained as needed.

In an embodiment of the present invention, a method for producing the above-described PAS resin composition is a method for producing the PAS resin composition that contains a PAS resin, a thermoplastic resin other than the PAS resin, and a metal oxide containing at least one of copper or chromium, all as described above, and includes step 1, in which a thermoplastic resin composition is obtained by melting and kneading at least the thermoplastic resin and the metal oxide, and step 2, in which the PAS resin composition is obtained by melting and kneading at least the thermoplastic resin composition and the PAS resin.

According to this method for producing a PAS resin composition, a PAS resin composition can be produced in which a PAS resin as described above forms a continuous phase, and a dispersed phase containing a thermoplastic resin and a metal oxide, both as described above, is formed in the continuous phase. It is not necessarily clear why such an advantage arises, but the inventors presume it owes to the following mechanism. That is, PAS resins as described above are generally incompatible with thermoplastic resins as described above. Therefore, even if the thermoplastic resin and the metal oxide are melted and molded first to give the thermoplastic resin composition, and then this thermoplastic resin composition is melted and kneaded with the PAS resin, the inventors believe, the metal oxide in the thermoplastic resin composition does not easily migrate into the continuous phase formed by the PAS resin but rather forms the dispersed phase together with the thermoplastic resin. It should be noted that this mechanism is merely a presumption, and even if the advantages of the present invention are produced by other reasons, this production method is included in the technical scope of the present invention.

Step 1 is a step in which the thermoplastic resin composition is obtained by melting and kneading at least a thermoplastic resin and a metal oxide, both as described above. Step 1 includes melting and kneading at least a thermoplastic resin and a metal oxide. In this step, the thermoplastic resin composition may include melting and kneading a clay mineral, glass fiber, an extra resin, filler, a silane coupling agent, a thermoplastic elastomer, and additives, all as described above, as its optional ingredients as needed. In achieving a practical speed of plating deposition on the resulting molded article, it is preferred to melt and knead at least a thermoplastic resin, a metal oxide, and a clay mineral, all as described above, in step 1.

In step 1, it is preferred, in producing the resin composition in which a PAS resin as described above forms a continuous phase, and a dispersed phase containing a thermoplastic resin and a metal oxide, both as described above, is formed in the continuous phase, that the thermoplastic resin be one having a higher melt viscosity than the PAS resin. It is not necessarily clear why such an advantage is attained by using a thermoplastic resin having a higher melt viscosity than the PAS resin, but the inventors presume it owes to the following mechanism. That is, even if the thermoplastic resin and the metal oxide are melted and molded first to give the thermoplastic resin composition in step 1, and then this thermoplastic resin composition and the PAS resin are melted and kneaded in step 2, the inventors believe, the metal oxide in the thermoplastic resin composition, containing the thermoplastic resin having a higher melt viscosity than the PAS resin, does not easily migrate into the continuous phase formed by the PAS resin but rather forms a dispersed phase together with the thermoplastic resin.

Of those thermoplastic resins having a higher melt viscosity than the PAS resin, thermoplastic resins with higher laser sensitivity than the PAS resin are particularly preferred in achieving a practical speed of plating deposition on the resulting molded article. Examples of thermoplastic resins with higher laser sensitivity than the PAS resin are polyamide resins, and, of polyamide resins, aromatic polyamide resins are particularly preferred in imparting heat resistance to the resulting molded article and laminate.

The melting and kneading in step 1 can be performed using known methods as needed.

If the thermoplastic resin has a melting point, it is usually preferred that the melting and kneading in step 1 be carried out at a temperature equal to or higher than this melting point, more preferably a temperature equal to or higher than this melting point plus 10° C., even more preferably a temperature equal to or higher than this melting point plus 20° C., in particular a temperature equal to or higher than this melting point plus 30° C. Alternatively, if the thermoplastic resin has no melting point, it is preferred that the melting and kneading be conducted at a temperature equal to or higher than the glass transition temperature plus 50° C., more preferably a temperature equal to or higher than the glass transition temperature plus 60° C., even more preferably a temperature equal to or higher than the glass transition temperature plus 70° C., in particular a temperature equal to or higher than the glass transition temperature plus 80° C. There is no absolute rule on the specific temperature for the melting and kneading in step 1 because it can vary with the thermoplastic resin used, but preferably, for example, the melting and kneading temperature is in the range of 300° C. or above, more preferably 310° C. or above, preferably 400° C. or below, more preferably 370° C.

The instrument for the melting and kneading in step 1 is not critical, but examples include dry blending in a ribbon blender, Henschel mixer, V blender, or similar device followed by a Banbury mixer, mixing rolls, a single-screw extruder, a twin-screw extruder, or a kneader. Of these, it is preferred to use a twin-screw extruder. It should be noted that one of these devices may be used alone, or two or more may be used in combination.

In the following, an exemplary set of production parameters in step 1 possible in the preferred embodiment of using a twin-screw extruder is described in detail.

The rate of extrusion of the resin component is preferably in the range of 5 kg/hr or more, preferably 500 kg/hr or less.

The screw rotation speed is preferably in the range of 50 rpm or more, preferably 500 rpm or less.

The ratio of the extrusion rate and the screw rotation speed (extrusion rate/screw rotation speed) is preferably in the range of 0.02 kg/hr/rpm or more and 5 kg/hr/rpm or less.

To prepare the thermoplastic resin composition, the ingredients may be put into the device for melting and kneading simultaneously or may be introduced separately. In the latter case, the manufacturer can introduce the thermoplastic resin, metal oxide, etc., from the top feeder and the side feeder of the twin-screw extruder. In this case, the ratio between the distance from the resin inlet to the side feeder and the total screw length of the twin-screw extruder (distance from the resin inlet to the side feeder/total screw length) is preferably in the range of 0.1 or more, more preferably 0.3 or more, preferably 0.9 or less, more preferably 0.7 or less.

In addition, the thermoplastic resin composition obtained in such a way may be processed into the form of pellets, chips, granules, powder, etc., by known methods.

Step 2 is a step in which the PAS resin composition is obtained by melting and kneading at least the above thermoplastic resin composition and a PAS resin as described above. Step 2 includes melting and kneading at least a thermoplastic resin composition and a PAS resin, both as described above. In this step, a clay mineral, glass fiber, an extra resin, filler, a silane coupling agent, and additives, all as described above, may be mixed into the PAS resin beforehand.

The melting and kneading in step 2 can be performed using known methods as needed.

If the thermoplastic resin has a melting point, it is usually preferred that the melting and kneading in step 2 be carried out at a temperature equal to or higher than this melting point or the melting point of the PAS resin, whichever is the higher, more preferably a temperature equal to or higher than the higher melting point plus 10° C., even more preferably a temperature equal to or higher than this higher melting point plus 20° C. Alternatively, if the thermoplastic resin has no melting point, it is preferred that the melting and kneading be conducted at a temperature equal to or higher than the glass transition temperature plus 50° C. or the melting point of the PAS resin, whichever is the higher, more preferably a temperature equal to or higher than the higher temperature plus 10° C., even more preferably a temperature equal to or higher than the higher temperature plus 20° C. There is no absolute rule on the specific temperature for the melting and kneading in step 2 because it can vary with the resins used, but preferably, the melting and kneading temperature is in the range of 300° C. or above, more preferably 310° C. or above, preferably 400° C. or below, more preferably 370° C. or below.

The instrument for the melting and kneading in step 2 is not critical, but examples include dry blending in a ribbon blender, Henschel mixer, V blender, or similar device followed by a Banbury mixer, mixing rolls, a single-screw extruder, a twin-screw extruder, or a kneader. Of these, it is preferred to use a twin-screw extruder. It should be noted that one of these devices may be used alone, or two or more may be used in combination.

In the following, an exemplary set of production parameters in step 2 possible in the preferred embodiment of using a twin-screw extruder is described in detail.

The rate of extrusion of the resin component is preferably in the range of 5 kg/hr or more, preferably 500 kg/hr or less.

The screw rotation speed is preferably in the range of 50 rpm or more, preferably 500 rpm or less.

The ratio of the extrusion rate and the screw rotation speed (extrusion rate/screw rotation speed) is preferably in the range of 0.02 kg/hr/rpm or more and 5 kg/hr/rpm or less.

The PAS resin and the thermoplastic resin composition may be prepared into a mixture beforehand and then put into the twin-screw extruder or may be prepared inside the twin-screw extruder. In the latter case, the manufacturer can introduce the PAS resin, thermoplastic resin composition, etc., from the side feeder of the twin-screw extruder. In this case, the ratio between the distance from the resin inlet to the side feeder and the total screw length of the twin-screw extruder (distance from the resin inlet to the side feeder/total screw length) is preferably in the range of 0.1 or more, more preferably 0.3 or more, preferably 0.9 or less, more preferably 0.7 or less.

Furthermore, it is possible to produce the PAS resin composition using one twin-screw extruder through steps 1 and 2. In that case, a twin-screw extruder having one or multiple side feeders is used. Examples of possible methods include ones in which the thermoplastic resin is supplied from the main feeder, the metal oxide is supplied from the first side feeder, the PAS resin and a clay mineral and other additives as described above are supplied from subsequent side feeders, and the materials are melted and kneaded, and ones in which a mixture of the thermoplastic resin and the metal oxide is supplied from the main feeder, the PAS resin and a clay mineral and other additives as described above are supplied from the side feeder, and the materials are melted and kneaded.

In addition, the PAS resin composition obtained in such a way may be processed into the form of pellets, chips, granules, powder, etc., by known methods.

According to a form of the present invention, a method for producing the above molded article is provided.

In an embodiment, the method for producing the above molded article includes step 3, in which the above PAS resin composition that contains a PAS resin, a thermoplastic resin, and a metal oxide all as described above and in which the PAS resin forms a continuous phase, and a dispersed phase containing the thermoplastic resin and the metal oxide is formed in the continuous phase. Further, the method for producing the above molded article includes step 3 and step 4, in which a roughened surface is formed by roughening at least part of the surface of the molded article molded.

Step 3 is a step in which the above-described PAS resin composition is molded.

The method for the molding in step 3 is not critical, and known techniques can be employed as needed. Specific examples include melt molding, such as injection, compression, and other types of extrusion molding, pultrusion molding, blow molding, and transfer molding. Of these, it is preferred that the molding method be extrusion molding, more preferably injection molding. It should be noted that one such molding method may be used alone, or two or more may be used in combination.

In addition, in step 3, the above-described PAS resin composition may be molded directly.

For the molding parameters, such as molding temperature and die temperature, known methods can be employed as needed.

Step 4 is a step in which a roughened surface as described above is formed by roughening at least part of the surface of the molded article molded. Step 4 is, for example, a step in which at least one roughened surface is formed by irradiating the surface with an actinic ray of energy. It should be noted that "irradiation with an actinic ray of energy" herein may be referred to as "laser irradiation."

Examples of actinic rays of energy include rays of light, such as ultraviolet radiation, visible light, and infrared radiation; an electron beam; radiation, such as α radiation, β radiation, γ radiation, an X-ray, and a neutron beam; electric discharges, such as sparks, corona discharges, glow discharges, and arc discharges; and electromagnetic waves, such as microwaves. Of these, it is preferred that the actinic ray of energy be a ray of light, an electron beam, or radiation, more preferably ultraviolet radiation, infrared radiation, or an electron beam, even more preferably infrared radiation or an electron beam.

The source of the actinic ray of energy used is not critical either. For instance, examples of ultraviolet sources include a xenon lamp, a high-pressure mercury lamp, and a metal-halide lamp. Furthermore, examples of electron beam sources include electron beam accelerators, for example of Cockcroft-Walton, Van de Graaff, resonant transformer, insulated core transformer, linear, Dynamitron, and radiofrequency types.

The power of the actinic ray of energy is not critical, but preferably is in the range of 1 W or more, more preferably 5 w or more, preferably 20 W or less, more preferably 12 W or less.

The irradiation with an actinic ray of energy may be extensive for improving the anchoring effect. In such a case, it is preferred that the area irradiated with the actinic ray of energy be 10% or more, more preferably 50% or more, even more preferably 95% or more, in particular 100% of the surface for intermaterial contact.

Circuitry, for example, may be formed through the irradiation with an actinic ray of energy for application to LDS technology. The circuitry, for example, formed can be changed as needed, for example according to the purpose of use.

According to a form of the present invention, a laminate is provided.

The laminate is a laminate of the above molded article and metal. The molded article has a roughened surface, and the metal is placed in contact with the roughened surface.

The arithmetic average roughness of the roughened surface is not critical, but preferably is in the range of 2.8 μm or more, preferably 5.0 μm or less.

Typically, the laminate is applied to LDS technology to give a molded interconnect device (MID). Therefore, it is preferred that the shape of the roughened surface the molded article has be a circuitry or similar shape.

The metal can be of any kind, but examples include copper, nickel, gold, silver, palladium, aluminum, and alloys containing them. Of these, it is preferred that the metal be copper, nickel, gold, or an alloy containing them, more preferably copper or nickel. It should be noted that one such metal may be used alone, or two or more may be used in combination.

In addition, the laminate may have a solder resist layer for the prevention of short-circuiting between the plating layers formed (wiring and electrodes) on the area of the surface of the molded article without the plating layers (i.e., the area of the surface excluding the roughened surface).

This laminate can be used in a wide range of applications. Examples include electric/electronic components, typically protective/supporting elements/multiple separate semiconductors or modules for box-shaped integrated modules of electric/electronic components, sensors, LED lamps, connectors, sockets, resistors, relay casings, switches, coil bobbins, capacitors, variable capacitor casings, optical pickups, oscillators, types of terminal boards, transformers, plugs, printed circuit boards, electronic circuits, LSI devices, ICs, tuners, loudspeakers, microphones, headphones, small motors, magnetic head bases, power modules, terminal blocks, semiconductors, liquid crystals, FDD carriages, FDD chassis, motor brush holders, parabolic antennas, and computer components; home and office appliance components, typically VTR components, television components, irons, hairdryers, rice cooker components, microwave components, acoustic components, audio/visual components, for example of audio/laserdisc/compact disc/DVD/Blu-ray disc systems, lighting components, fridge components, air conditioner components, typewriter components, word processor components, and plumbing system components, such as water heaters and bath water level and temperature sensors; machinery components, typically office computer components, telephone components, facsimile components, photocopier components, jigs for cleaning, motor components, printers, and typewriters; optical device or precision machinery components, typically microscopes, binoculars, cameras, and clocks; and automotive/vehicle components, such as alternator terminals, alternator connectors, IC regulators, potentiometer bases for light dimmers, relay blocks, inhibitor switches, exhaust gas and other valves, types of fuel-related/exhaust/air-intake piping, air-intake nozzle snorkels, intake manifolds, fuel pumps, engine-coolant joints, carburetor bodies, carburetor spacers, exhaust gas sensors, coolant sensors, oil temperature sensors, brake-pad wear sensors, throttle position sensors, crankshaft position sensors, air-flow meters, brake-pad wear sensors, thermostat bases for air conditioners, warm-air flow control valves, brush holders for radiator motors, water-pump impellers, turbine vanes, wiper motor components, distributors, starter switches, ignition coils and their bobbins, motor insulators, motor rotors, motor cores, starter relays, wire harnesses for transmission, window washer nozzles, air-conditioner panel switchboards, coils for fuel-related electromagnetic valves, connectors for fuses, horn terminals, insulator plates for electric components, stepper-motor rotors, lamp sockets, lamp reflectors, lamp housings, brake pistons, solenoid bobbins, engine-oil filters, and ignitor casings.

According to a form of the present invention, a method for producing the above laminate is provided.

According to this embodiment, the method for producing the above laminate is a method for producing a laminate of the above molded article and metal as described above, the molded article containing a PAS resin, a thermoplastic resin, and a metal oxide, all as described above, the PAS resin forming a continuous phase with there being formed in the continuous phase a dispersed phase containing the thermoplastic resin and the metal oxide, and having a roughened surface on part of its surface. The method has step 5, in which the metal is placed in contact with the roughened surface.

Step 5 is a step in which metal as described above is placed in contact with a roughened surface as described above. Specifically, the method for placing the metal in contact with the roughened surface is plating, and the plating is preferably performed by, for example, bringing molten metal into contact with the roughened surface as this ensures a thin film will be formed well with activated metal oxide exposed on the surface of the molded article.

In step 5, there is no unequivocally practical speed of plating deposition because it depends partly on the form and purpose of use, but to take an example, with the method and parameters in Examples, the speed of plating deposition is preferably 1.0 μm/hour or more, more preferably 2.0 μm/hour or more, even more preferably 2.5 μm/hour or more.

EXAMPLES

In the following, the present invention is detailed in specific terms by providing examples. The present invention, however, is not limited to these. The Examples are described using the expression of "parts" or "%," which represents "parts by mass" or "% by mass" unless stated otherwise.

[Exemplary Synthesis of a PPS Resin]

A PPS resin was synthesized by the following method.

(Step (1))

A 150-liter autoclave with stirring blades and a pressure gauge, a thermometer, a condenser, a decanter, and a fractionating column joined thereto was loaded with 33.222 kg (226 moles) of p-dichlorobenzene (p-DCB), 3.420 kg (34.5 moles) of N-methyl-2-pyrrolidone (NMP), 27.300 kg of an aqueous solution of sodium hydrogen sulfide (NaSH) (47.23% by mass) (230 moles as NaSH), and 18.533 g of an aqueous solution of sodium hydroxide (NaOH) (49.21% by mass) (228 moles as NaOH). The resulting liquid mixture was heated to 173° C. over 5 hours in a nitrogen atmosphere while being stirred, thereby 27.300 kg of water was distilled away, and then the autoclave was closed tightly. The p-DCB that boiled off together during the dehydration was separated using the decanter and returned to the autoclave at appropriate times.

Inside the autoclave after the end of dehydration, an anhydrous sodium sulfide composition in the form of fine particles was dispersed in p-DCB. The amount of NMP in this composition was 0.079 kg (0.8 moles), indicating 98 mol % (33.7 moles) of the introduced NMP was hydrolyzed into the sodium salt of the ring-opened derivative of NMP (4-(methylamino)butyric acid) (SMAB). The amount of SMAB inside the autoclave was 0.147 moles per mole of sulfur atoms present in the autoclave. Since the theoretical amount of water removed when all of the introduced NaSH and NaOH turns into anhydrous Na2S is 27.921 g, the result indicates that of 878 g (48.8 moles) of leftover water in the autoclave, 609 g (33.8 moles) was consumed in the hydrolysis of NMP and NaOH, therefore not present as water inside the autoclave, whereas the rest, 269 g (14.9 moles), remained inside the autoclave in the form of water or water of crystallization. The amount of water inside the autoclave was 0.065 moles per mole of sulfur atoms present there.

(Step (2))

After step (1) above, the internal temperature of the autoclave was lowered to 160° C. and then, after the addition of 46.343 kg (467.5 moles) of NMP, increased to 185° C. The amount of water inside the autoclave was 0.025 moles per mole of NMP added in step (2). When the gauge pressure reached 0.00 MPa, the valve to which the fractionating column was joined was released, and the autoclave was heated to an internal temperature of 200° C. over 1 hour. During this, the temperature at the outlet of the fractionating column was controlled by cooling and valve adjustment to remain 110° C. or below. The steam mixture produced by boiling p-DCB and water was condensed through the condenser and separated using the decanter, and p-DCB was returned to the autoclave. The amount of water removed was 228 g (12.7 moles).

(Step (3))

The amount of water inside the autoclave at the start of step (3) was 41 g (2.3 moles), corresponding to 0.005 moles per mole of NMP added in step (2) and 0.010 moles per mole of sulfur atoms present inside the autoclave. The amount of SMAB inside the autoclave was the same as in step (1), 0.147 moles per mole of sulfur atoms present in the autoclave. Then the internal temperature was increased from 200° C. to 230° C. over 3 hours, and the autoclave was stirred for 1 hour at 230° C. The internal temperature was further increased to 250° C. thereafter, and the autoclave was stirred for 1 hour. The gauge pressure when the internal temperature was 200° C. was 0.03 MPa, and the final gauge pressure was 0.40 MPa. After cooling, 650 g of the resulting slurry was poured into 3 liters of water, and the resulting mixture was stirred at 80° C. for 1 hour and then filtered. This cake was washed by stirring in 3 liters of warm water for 1 hour again, and then the mixture was filtered. This operation was repeated four times. This cake was combined with 3 liters of water again, and the pH was adjusted to 4.0 by adding acetic acid. After washing by 1 hour of stirring, the mixture was filtered. This cake was washed by stirring in 3 liters of warm water for 1 hour again, and then the mixture was filtered. This operation was repeated twice. The residue was dried at 120° C. overnight using a hot-air oven, giving a white powder of PPS resin.

The melt viscosity at 300° C. of the PPS resin was measured by the following method. That is, for the PPS resin, the melt viscosity at 300° C. was measured using CFT-500D flow tester (Shimadzu Corporation) after the resin was held under the conditions of a temperature of 300° C., a load of 1.96×106 Pa, and L/D=10 (mm)/1 (mm) for 6 minutes. As a result, the melt viscosity at 300° C. of the PPS resin was 41 Pa·s.

Furthermore, the non-Newtonian index of the PPS resin was measured by the following method. That is, the shear rate and shear stress were measured under the conditions of a temperature of 300° C. and orifice length (L)/orifice diameter (D)=40. Then the non-Newtonian index was calculated using equation (1) below.

$$SR = K \cdot SS^N \quad \text{[Math. 1]}$$

In this equation, SR is the shear rate (second$^{-1}$), SS is shear stress (dynes/cm$^2$), K is a constant, and N is the non-Newtonian index.

As a result, the non-Newtonian index of the PPS resin was 1.07.

[Aromatic Polyamide Resin]

Aromatic polyamide resin (1) (melting point, 310° C.; Tg, 120° C.) obtained by allowing 65 to 70 mol % Solvay Advanced Polymers K.K.'s "Amodel A-1004" terephthalic acid, isophthalic acid, and hexamethylene diamine as essential monomer components to react together was used.

Example 1

Step 1: Production Example 1, the Production of Thermoplastic Resin Composition (1)

In a tumbler, 100.0 parts of aromatic polyamide resin (1), 82.0 parts of copper chromite (CuCr$_2$O$_4$), and 38.0 parts of talc (trade name "MICRO ACE P-3," Nippon Talc Co., Ltd.; the same applies hereinafter) were mixed uniformly. Then the resulting mixture was put into TEM-35B (Toshiba Machine Co., Ltd.), a vented twin-screw extruder, and melted and kneaded under the following conditions: the rate of extrusion of the resin component, 30 kg/hr; screw rotation speed, 200 rpm; the ratio between the extrusion rate (kg/hr) and the screw rotation speed (rpm) (extrusion rate/screw rotation speed), 0.15 (kg/hr·rpm); resin temperature setting, 360° C. In this way, thermoplastic resin composition (1) was obtained.

Step 2

In a tumbler, 220.0 parts of thermoplastic resin composition (1), 100.0 parts of the synthesized PPS resin, and 80.0 parts of glass fiber (fiber length, 3 mm; average diameter, 10 μm; trade name "T-747H," Nippon Electric Glass Co., Ltd.; the same applies hereinafter) were mixed uniformly. Then the resulting mixture was put into TEM-35B (Toshiba Machine Co., Ltd.), a vented twin-screw extruder, and melted and kneaded under the following conditions: the rate of extrusion of the resin component, 30 kg/hr; screw rotation speed, 200 rpm; the ratio between the extrusion rate (kg/hr) and the screw rotation speed (rpm) (extrusion rate/screw rotation speed), 0.15 (kg/hr·rpm); resin temperature setting, 340° C. In this way, PPS resin composition 1 (pellets) was produced.

Example 2

Step 1

Step 1 according to Example 2 is not described because it was the same as step 1 according to Example 1.

Step 2

PPS resin composition 2 (pellets) was produced in the same way as in step 2 according to Example 1, except that the amount of thermoplastic resin composition (1) and the amount of glass fiber were changed to 86.0 parts and 47.0 parts, respectively.

Example 3

Step 1: Production Example 2, the Production of Thermoplastic Resin Composition (2)

Thermoplastic resin composition (2) was obtained in the same way as in step 1 according to Example 1, except that the amount of copper chromite and the amount of talc were changed to 133.3 parts and 62.0 parts, respectively.

Step 2

PPS resin composition 3 (pellets) was produced in the same way as in step 2 according to Example 1, except that thermoplastic resin composition (1) was changed to thermoplastic resin composition (2), and the amount of the resin composition and the amount of glass fiber were changed to 129.0 parts and 57.0 parts, respectively.

Example 4

Step 1: Production Example 3, the Production of Thermoplastic Resin Composition (3)

Thermoplastic resin composition (3) was obtained in the same way as in step 1 according to Example 1, except that the amount of copper chromite and the amount of talc were changed to 25.0 parts and 11.6 parts, respectively.

Step 2

PPS resin composition 4 (pellets) was produced in the same way as in step 2 according to Example 1, except that thermoplastic resin composition (1) was changed to thermoplastic resin composition (3), and the amount of the resin composition and the amount of glass fiber were changed to 75.0 parts and 44.0 parts, respectively.

Example 5

Step 1

Step 1 according to Example 5 is not described because it was the same as step 1 according to Example 3.

Step 2

PPS resin composition 5 (pellets) was produced in the same way as in step 2 according to Example 1, except that thermoplastic resin composition (1) was changed to thermoplastic resin composition (2), the amount of the resin composition and the amount of glass fiber were changed to 150.0 parts and 70.0 parts, respectively, and 35.0 parts of copper chromite was additionally mixed in.

Example 6

Step 1: Production Example 4, the Production of Thermoplastic Resin Composition (4)

Thermoplastic resin composition (4) was obtained in the same way as in step 1 according to Example 1, except that aromatic polyamide resin (1) was changed to a modified polyphenylene ether resin (trade name "Iupiace PX-100L," Mitsubishi Engineering-Plastics), and the amount of copper chromite and the amount of talc were changed to 82.0 parts and 38.0 parts, respectively.

Step 2

PPS resin composition 6 (pellets) was produced in the same way as in step 2 according to Example 1, except that thermoplastic resin composition (1) was changed to thermoplastic resin composition (4), and the amount of the resin composition and the amount of glass fiber were changed to 86.0 parts and 47.0 parts, respectively.

Example 7

Step 1: Production Example 5, the Production of Thermoplastic Resin Composition (5)

Thermoplastic resin composition (5) was obtained in the same way as in step 1 according to Example 1, except that aromatic polyamide resin (1) was changed to an aliphatic polyamide resin (trade name "A3W," BASF).

Step 2

PPS resin composition 7 (pellets) was produced in the same way as in step 2 according to Example 1, except that thermoplastic resin composition (1) was changed to thermoplastic resin composition (5), and the amount of the resin composition and the amount of glass fiber were changed to 86.0 parts and 47.0 parts, respectively.

Example 8

Step 1: Production Example 6, the Production of Thermoplastic Resin Composition (6)

Thermoplastic resin composition (6) was obtained in the same way as in step 1 according to Example 1, except that aromatic polyamide resin (1) was changed to a polycarbonate resin (trade name "Iupilon E-2000," Mitsubishi Engineering-Plastics).

Step 2

PPS resin composition 8 (pellets) was produced in the same way as in step 2 according to Example 1, except that thermoplastic resin composition (1) was changed to thermoplastic resin composition (6), and the amount of the resin composition and the amount of glass fiber were changed to 86.0 parts and 47.0 parts, respectively.

Comparative Example 1

PPS resin composition 9 (pellets) was produced in the same way as in step 2 according to Example 1, except that no thermoplastic resin composition was used, and 29 parts, 14 parts, and 36 parts of copper chromite, talc, and glass fiber, respectively, were mixed in.

Comparative Example 2

PPS resin composition 10 (pellets) was produced in the same way as in step 2 according to Example 1, except that no thermoplastic resin composition was used, and 100.0 parts, 100.0 parts, 82.0 parts, 38 parts, and 80.0 parts of aromatic polyamide resin (1), the PPS resin, copper chromite, talc, and glass fiber, respectively, were mixed in.

Comparative Example 3

PPS resin composition 11 (pellets) was produced in the same way as in step 2 according to Example 1, except that no PPS resin was used, and 200 parts, 82 parts, 38 parts, and 80 parts of aromatic polyamide resin (1), copper chromite, talc, and glass fiber were mixed in.

The amounts of each ingredient in Production Examples 1 to 6 are presented in Table 1. Furthermore, the amounts of each ingredient in Examples 1 to 8 and Comparative Examples 1 to 3 are presented in Table 2.

[Performance Testing]

PPS resin compositions 1 to 11, produced in Examples 1 to 8 and Comparative Examples 1 to 3, were tested.

(Production of a Molded Article)

A molded article was produced by feeding the PPS resin composition (pellets) to SE75-DU injection molding machine (Sumitomo Heavy Industries, Ltd.) (cylinder temperature, 320° C.) and carrying out injection molding using an ISO 20753 type D12 small square plate specimen (60× 60×2 mm thick; die temperature, 150° C.)

(Formation of a Roughened Surface)

A roughened surface was formed in a 10×10 mm area of the small square plate specimen by irradiating this area using a SUNX Co., Ltd.'s LP-Z SERIES laser marker (wavelength, 1064 nm; YAG laser) with a power of 3 W, a frequency of 60 kHz, and at a rate of 2 m/s.

The platability tests in the Examples are specified below. The plating conditions, however, are not limited to this.

(Thickness of Plating Deposition)

The small square plate specimen having a roughened surface formed under the above conditions was subjected to electroless copper plating in a plating tank at 60° C. for 45 minutes using MacDermid's electroless MID Copper 100 XB Strike. The plated molded article was sectioned, and the thickness of plating deposition was measured.

(Peel Strength)

A roughened surface was formed in a 3×50 mm area of the small square plate specimen under the conditions specified above, then electroless copper plating was performed, and then a 30 to 40 µm thick plating pattern was formed by electrolytic copper plating. Part of an end of the resulting plating was peeled, the plating was pulled perpendicular to the test specimen at a rate of 50 mm/minute, the force at separation was measured, and the measured force was divided by the width of the plating to give peel strength (N/mm).

(Solder Reflow Resistance)

The test specimen with a formed plating pattern was immersed in a solder bath at 265° C. for 20 seconds, and its appearance was observed. The test specimen was left under 85° C. and 85% RH conditions for 24 hours before the test.

○, No abnormality in appearance; x, A swelling in the plated area (Average Size of the Dispersed Phase)

The molded article was cut vertically from the surface, the exposed cross-section was smoothened by polishing, and then the smoothened cross-section was imaged at a magnification of 3000× using a scanning electron microscope (trade name, Hitachi S-2380N). On the image obtained, ten domains of the dispersed phase were measured for their respective maximum and minimum diameters, the average diameter of each domain was determined, and then the mean of the average diameters was calculated to give the average size of the dispersed phase.

(Cross-Sectional Profile of a Resin Molded Article)

Figure 2:
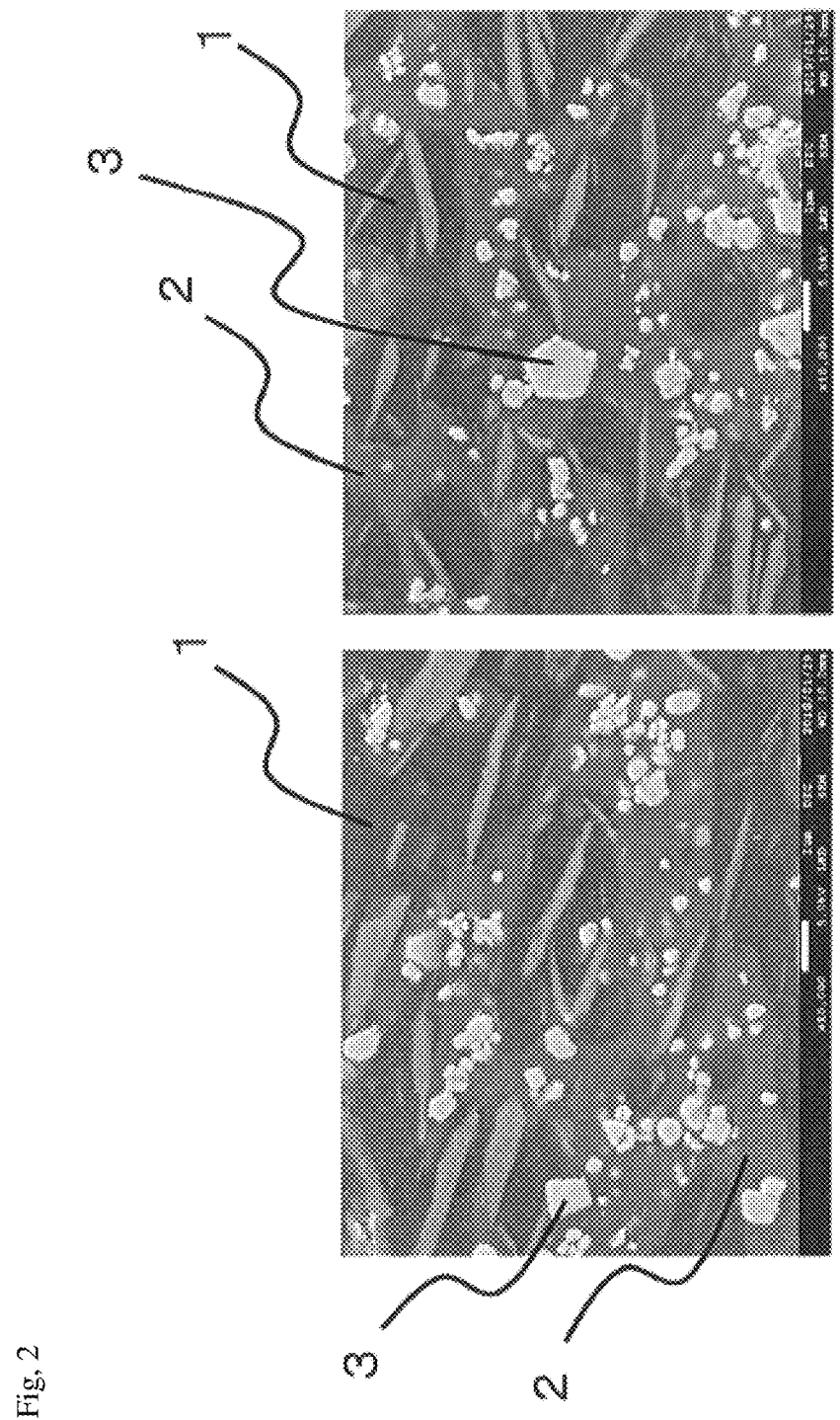
FIG. 2 presents images of a phase structure in a Comparative Example.

The molded article was cut vertically from the surface, the exposed cross-section was smoothened by polishing, and then the smoothened cross-section was imaged at a magnification of 3000× using a scanning electron microscope (trade name, Hitachi S-2380N). FIG. 1 is scanning electron microscope images of a cross-section of PPS resin composition 2, according to Example 2, and FIG. 2 is scanning electron microscope images of a cross-section of PPS resin composition 10, according to Comparative Example 2. In the figures, the darkest domains, indicated by 1, represent the aromatic polyamide resin, the domains indicated by 2 represent PPS resin domains, and the white domains, indicated by 3, represent copper chromite. As can be seen, in FIG. 1, according to Example 2, copper chromite is present in the aromatic polyamide resin, and in FIG. 2, according to Comparative Example 2, much copper chromite is present in the PPS resin.

(Distribution of the Metal Oxide)

The molded article was cut vertically from the surface, the exposed cross-section was smoothened by polishing, and then the smoothened cross-section was imaged at a magnification of 3000× using a scanning electron microscope (trade name, Hitachi S-2380N). The cross-section (equivalent circular diameter) of the particles of the metal oxide seen in the image was measured, and the distribution was calculated from the total cross-sectional area of all particles of the metal oxide as the denominator and the total cross-sectional area of the particles of the metal oxide present in the continuous phase as the numerator. It should be noted that any particle of the metal oxide at least part of which was in the dispersed phase was deemed to be present in the dispersed phase, and the rest was considered present in the continuous phase. The calculated percentage of the metal oxide present in the continuous phase was graded according to the criteria below, and the results are presented in Table 2.

Less than 10% . . . ☉+
10% or more and less than 20% . . . ☉
20% or more and less than 30% . . . ○
30% or more and less than 70% . . . Δ
70% or more . . . X (Long-Term Thermal Mechanical Characteristics)

Test specimens were produced by feeding the PPS resin compositions (pellets) according to each Example or Comparative Example to SE75-DU injection molding machine (Sumitomo Heavy Industries, Ltd.) (cylinder temperature, 320° C.) and carrying out injection molding using an ISO 20753 type A1 specimen with narrow parallel-sided section and tabs (die temperature, 150° C.). The resulting test specimens were treated in an oven 180° C. for 1000 hours. Before and after the treatment, the test specimens were subjected to tensile testing at 23° C. under test conditions ISO 527. The percentage tensile strength after the treatment was determined.

The amounts of ingredients and the results of each test in Examples 1 to 8 and Comparative Examples 1 to 3 are presented in Table 2 below.

TABLE 1

| | | Thermoplastic resin | | Metal oxide | | Clay mineral | |
|---|---|---|---|---|---|---|---|
| | | Type | Amount (parts by mass) | Type | Amount (parts by mass) | Type | Amount (parts by mass) |
| Production Example 1 | Thermoplastic resin composition (1) | Aromatic polyamide resin (1) | 100.0 | $CuCr_2O_4$ | 82.0 | Talc | 38.0 |
| Production Example 2 | Thermoplastic resin composition (2) | Aromatic polyamide resin (1) | 100.0 | $CuCr_2O_4$ | 133.3 | Talc | 62.0 |
| Production Example 3 | Thermoplastic resin composition (3) | Aromatic polyamide resin (1) | 100.0 | $CuCr_2O_4$ | 25.0 | Talc | 11.6 |
| Production Example 4 | Thermoplastic resin composition (4) | Modified polyphenylene ether resin | 100.0 | $CuCr_2O_4$ | 82.0 | Talc | 38.0 |
| Production Example 5 | Thermoplastic resin composition (5) | Aliphatic polyamide resin | 100.0 | $CuCr_2O_4$ | 82.0 | Talc | 38.0 |
| Production Example 6 | Thermoplastic resin composition (6) | Polycarbonate resin | 100.0 | $CuCr_2O_4$ | 82.0 | Talc | 38.0 |

TABLE 2

| | PAS | | Thermoplastic resin composition | | Metal oxide | | Clay mineral | |
|---|---|---|---|---|---|---|---|---|
| | Type | Amount (parts by mass) | Type | Amount (parts by mass) | Type | Amount (parts by mass) | Type | Amount (parts by mass) |
| Example 1 | PPS resin | 100 | Thermoplastic resin composition (1) | 220 | — | — | — | — |
| Example 2 | PPS resin | 100 | Thermoplastic resin composition (1) | 86 | — | — | — | — |
| Example 3 | PPS resin | 100 | Thermoplastic resin composition (2) | 129 | — | — | — | — |
| Example 4 | PPS resin | 100 | Thermoplastic resin composition (3) | 75 | — | — | — | — |

TABLE 2-continued

| | | | | | | | | |
|---|---|---|---|---|---|---|---|---|
| Example 5 | PPS resin | 100 | Thermoplastic resin composition (2) | 150 | CuCr$_2$O$_4$ | 35 | — | — |
| Example 6 | PPS resin | 100 | Thermoplastic resin composition (4) | 86 | — | — | — | — |
| Example 7 | PPS resin | 100 | Thermoplastic resin composition (5) | 86 | — | — | — | — |
| Example 8 | PPS resin | 100 | Thermoplastic resin composition (6) | 86 | — | — | — | — |
| Comparative Example 1 | PPS resin | 100 | — | — | CuCr$_2$O$_4$ | 29 | Talc | 14 |
| Comparative Example 2 | PPS resin | 100 | Aromatic polyamide resin (1) | 100 | CuCr$_2$O$_4$ | 82 | Talc | 38 |
| Comparative Example 3 | PPS resin | — | Aromatic polyamide resin (1) | 200 | CuCr$_2$O$_4$ | 82 | Talc | 38 |

| | Glass fiber Amount (parts by mass) | Plating deposition thickness (μm) | Peel strength (N/mm) | Solder reflow resistance | Long-term thermal mechanical characteristics | Average size of the dispersed phase (μm) | Percentage of the metal oxide in the continuous phase to all metal oxide |
|---|---|---|---|---|---|---|---|
| Example 1 | 80 | 2.9 | 0.42 | ○ | 70% | 12 | ◎⁺ |
| Example 2 | 47 | 2.8 | 0.60 | ○ | 77% | 4 | ◎⁺ |
| Example 3 | 57 | 2.5 | 0.49 | ○ | 80% | 3 | ◎⁺ |
| Example 4 | 44 | 1.3 | 0.63 | ○ | 71% | 9 | ◎ |
| Example 5 | 70 | 3.3 | 0.40 | ○ | 79% | 4 | ○ |
| Example 6 | 47 | 2.4 | 0.63 | ○ | 62% | 5 | ◎ |
| Example 7 | 47 | 2.2 | 0.50 | ○ | 60% | 4 | ◎ |
| Example 8 | 47 | 2.3 | 0.52 | ○ | 60% | 5 | ◎ |
| Comparative Example 1 | 36 | 0.5 | 0.61 | ○ | 80% | — | — |
| Comparative Example 2 | 80 | 0.8 | 0.37 | X | 60% | 13 | X |
| Comparative Example 3 | 80 | 2.8 | 0.60 | X | 40% | — | — |

As can be seen from the results in Table 2, too, the molded articles obtained by molding the PPS resin compositions of Examples 1 to 8 exhibited plating deposition thickness values greater than 1 μm. This indicates with the PPS resin compositions of Examples 1 to 8, a practical speed of plating deposition can be achieved. Furthermore, the molded articles obtained by molding the PPS resin compositions of Examples 1 to 8 also exhibited peeling strength values equal to or higher than 0.4 N/mm, demonstrating the adhesiveness of plating was maintained. On the other hand, the molded articles obtained by molding the PPS resin compositions of Comparative Examples 1 and 2 had low plating deposition thickness values, and Comparative Example 3, in which no polyarylene sulfide was used, was inferior in solder reflow resistance and long-term heat resistance. The reader can see that the Comparative Examples failed to solve the problems intended in the present invention.

The invention claimed is:

1. A molded article comprising a polyarylene sulfide resin, a thermoplastic resin, which is an aromatic polyamide resin, a metal oxide containing at least one of copper or chromium, and a layered and cleavable clay mineral,
wherein the polyarylene sulfide resin forms a continuous phase, and a dispersed phase containing the thermoplastic resin and the metal oxide is formed in the continuous phase, and
wherein more than 0% and 30% or less of the metal oxide in the molded article is present in the continuous phase, and wherein the layered and cleavable clay mineral is more abundant in the dispersed phase like the metal oxide.

2. The molded article according to claim 1, wherein a ratio by mass between the polyarylene sulfide resin and the thermoplastic resin (the polyarylene sulfide resin/the thermoplastic resin) is in a range of 50/50 or more and 95/5 or less.

3. The molded article according to claim 1, wherein an amount of the metal oxide is in a range of 15 parts by mass or more and 90 parts by mass or less per 100 parts by mass of the polyarylene sulfide resin.

4. The molded article according to claim 1, wherein an amount of the metal oxide is in a range of 30 parts by mass or more and 200 parts by mass or less per 100 parts by mass of the thermoplastic resin.

5. The molded article according to claim 1, further comprising glass fiber.

6. The molded article according to claim 1, wherein the article has a roughened surface.

7. A polyarylene sulfide resin composition for use in the molded article according to claim 1, the composition comprising:
a polyarylene sulfide resin, a thermoplastic resin, a metal oxide containing at least one of copper or chromium, and a layered and cleavable clay mineral, wherein:
the polyarylene sulfide resin forms a continuous phase, and;

a dispersed phase containing the thermoplastic resin and the metal oxide is formed in the continuous phase, wherein more than 0% and 30% or less of the metal oxide in the molded article is present in the continuous phase, and wherein the layered and cleavable clay mineral is more abundant in the dispersed phase like the metal oxide.

8. A laminate comprising the molded article according to claim 6 and metal, wherein:

the metal is placed in contact with the roughened surface.

9. A method for producing the polyarylene sulfide resin composition according to claim 7, the method comprising:

step 1, in which a thermoplastic resin composition is obtained by melting and kneading at least the thermoplastic resin, the metal oxide, and the layered and cleavable clay mineral; and step 2, in which a polyarylene sulfide resin composition is obtained by melting and kneading at least the thermoplastic resin composition and the polyarylene sulfide resin.

10. A method for producing a molded article, the method comprising step 3, in which a polyarylene sulfide resin composition obtained in the production method according to claim 9 is melted and molded.

11. The method according to claim 10 for producing a molded article, further comprising step 4, in which a roughened surface is formed by roughening at least part of a surface of the molded article.

12. A method for producing a laminate of a molded article and metal according to claim 7 the method comprising:

step 5, in which metal is placed in contact with the roughened surface.

* * * * *